United States Patent
Riggs et al.

(10) Patent No.: US 9,955,279 B2
(45) Date of Patent: Apr. 24, 2018

(54) SYSTEMS AND METHODS OF CALIBRATING EARPHONES

(71) Applicant: OSSIC CORPORATION, San Diego, CA (US)

(72) Inventors: Jason Riggs, San Diego, CA (US); Joy Lyons, San Diego, CA (US); Nicholas Millias, San Diego, CA (US); Aderito Beltran, San Diego, CA (US)

(73) Assignee: Ossic Corporation, San Diego, CA (US)

( * ) Notice: Subject to any disclaimer, the term of this patent is extended or adjusted under 35 U.S.C. 154(b) by 0 days.

(21) Appl. No.: 15/592,736

(22) Filed: May 11, 2017

(65) Prior Publication Data

US 2017/0332186 A1 Nov. 16, 2017

Related U.S. Application Data

(60) Provisional application No. 62/335,014, filed on May 11, 2016.

(51) Int. Cl.
*H04S 7/00* (2006.01)
*H04R 5/033* (2006.01)
(Continued)

(52) U.S. Cl.
CPC .............. *H04S 7/301* (2013.01); *G06F 3/012* (2013.01); *H04R 5/033* (2013.01); *H04S 3/008* (2013.01); *H04S 7/304* (2013.01); *H04S 7/306* (2013.01); *G06T 7/60* (2013.01); *G06T 2207/30201* (2013.01); *H04S 2400/01* (2013.01); *H04S 2400/11* (2013.01); *H04S 2420/01* (2013.01)

(58) Field of Classification Search
CPC ........ H04S 2420/01; H04S 7/304; H04S 7/30; H04S 7/307; H04S 3/004; H04S 1/005; H04S 7/302; H04S 7/301
See application file for complete search history.

(56) References Cited

U.S. PATENT DOCUMENTS 3,984,885 A 10/1976 Yoshimura et al.
5,109,424 A 4/1992 Andre et al.
(Continued)

FOREIGN PATENT DOCUMENTS

JP 2014174430 A 9/2014

OTHER PUBLICATIONS

International Search Report and Written Opinion dated Jun. 22, 2012 in International Application No. PCT/US2016/021882, 15 Pages.
(Continued)

*Primary Examiner* — Mohammad Islam
(74) *Attorney, Agent, or Firm* — Perkins Coie LLP

(57) ABSTRACT

Systems and methods to calibrate listening devices are disclosed herein. In some embodiments, a method to calibrate earphones includes determining a Head Related Transfer Functions (HRTF) corresponding to different parts of a user's anatomy (e.g., one or both of a listener's pinnae). The resulting HRTFs are combined to form a composite HRTF. In some embodiments, a first and a second HRTF are respectively determined for a first and second part of the user's anatomy. A composite HRTF of the user is generated by combining portions of the first and second HRTFs.

21 Claims, 21 Drawing Sheets

(51) Int. Cl.
*H04S 3/00* (2006.01)
*G06F 3/01* (2006.01)
*G06T 7/60* (2017.01)

(56) References Cited

U.S. PATENT DOCUMENTS

| | | | |
|---|---|---|---|
| 5,729,612 | A | 3/1998 | Abel et al. |
| 6,067,361 | A | 5/2000 | Kohut et al. |
| 8,767,968 | B2 | 7/2014 | Flaks et al. |
| 8,787,584 | B2 | 7/2014 | Nyström et al. |
| 2003/0123676 | A1 | 7/2003 | Schobben et al. |
| 2003/0147543 | A1 | 8/2003 | Katayama et al. |
| 2004/0091119 | A1 | 5/2004 | Duraiswami et al. |
| 2006/0013409 | A1 | 1/2006 | Desloge et al. |
| 2008/0273721 | A1 | 11/2008 | Walsh et al. |
| 2009/0046864 | A1* | 2/2009 | Mahabub .......... H04S 7/30 381/17 |
| 2009/0116657 | A1 | 5/2009 | Edwards et al. |
| 2011/0286601 | A1 | 11/2011 | Fukui et al. |
| 2012/0328107 | A1* | 12/2012 | Nystrom .......... H04S 7/303 381/17 |
| 2013/0177166 | A1* | 7/2013 | Agevik .......... H04S 1/005 381/74 |
| 2013/0202117 | A1 | 8/2013 | Brungart et al. |
| 2014/0064526 | A1 | 3/2014 | Otto et al. |
| 2015/0189440 | A1 | 7/2015 | Gran et al. |
| 2015/0230036 | A1 | 8/2015 | Pedersen et al. |
| 2016/0044436 | A1 | 2/2016 | Butera et al. |
| 2016/0269849 | A1* | 9/2016 | Riggs .......... H04S 7/304 |
| 2017/0208416 | A1* | 7/2017 | Petrov .......... H04S 7/304 |

OTHER PUBLICATIONS

International Search Report and Written Opinion dated Jul. 11, 2017 in International Application No. PCT/US2017/032223, 14 pages.
U.S. Appl. No. 15/067,138, filed Mar. 10, 2016.

* cited by examiner

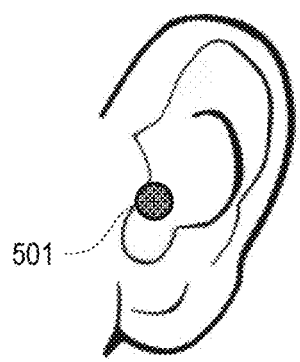
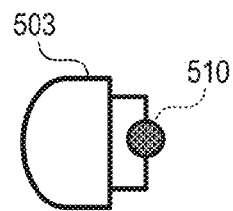
*FIG. 5A*  *FIG. 5B*
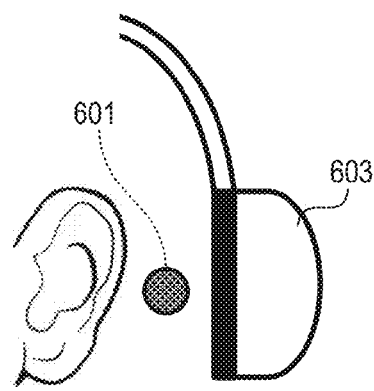
*FIG. 6*
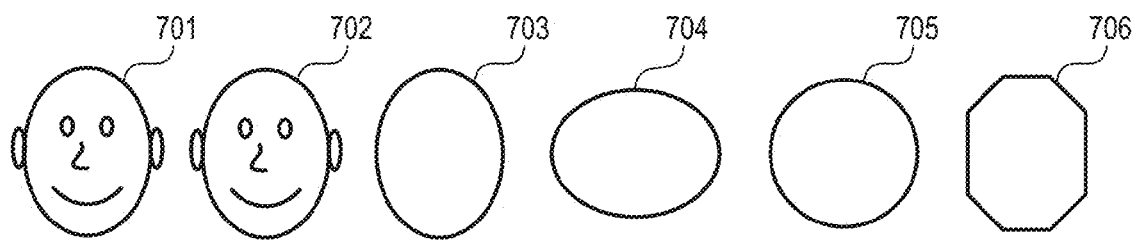
*FIG. 7*

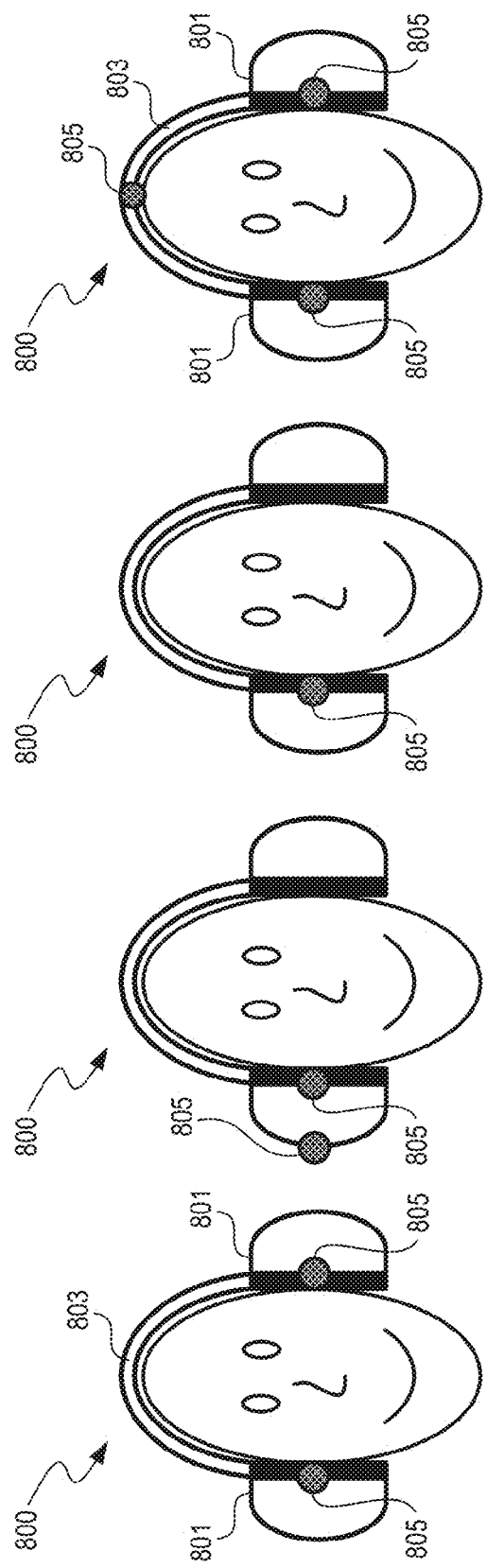

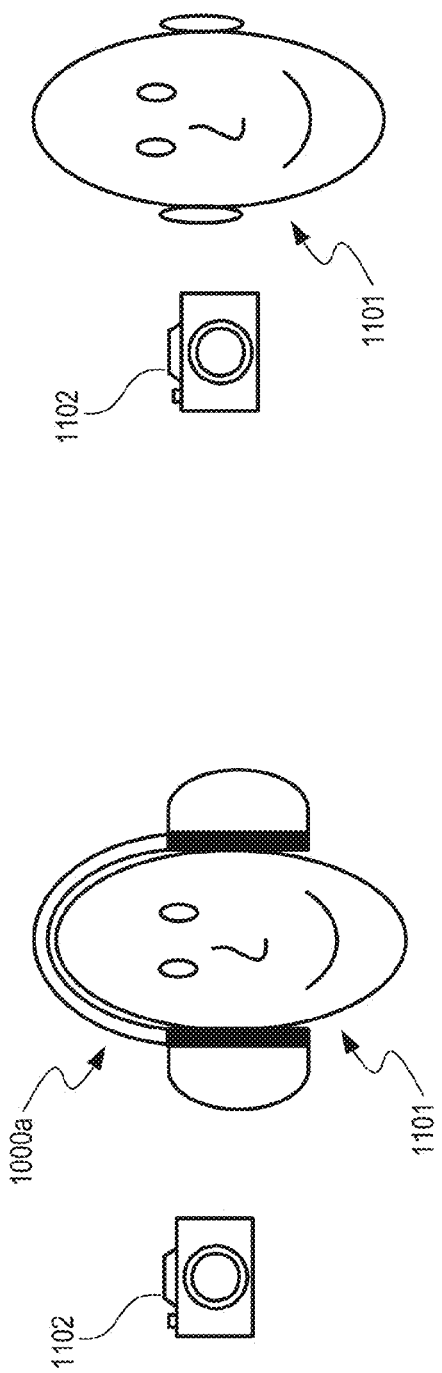
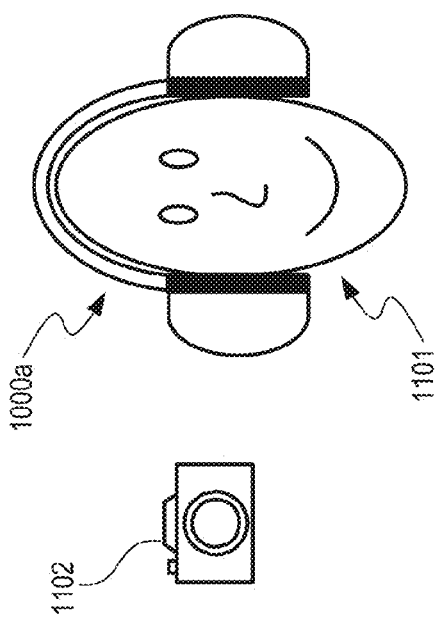
FIG. 11A
FIG. 11C
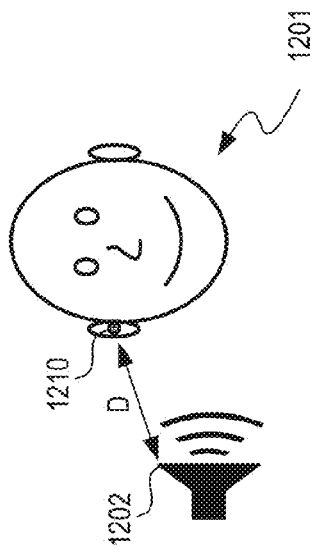
FIG. 11B
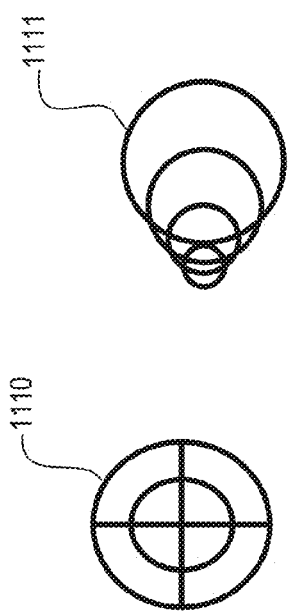
FIG. 12

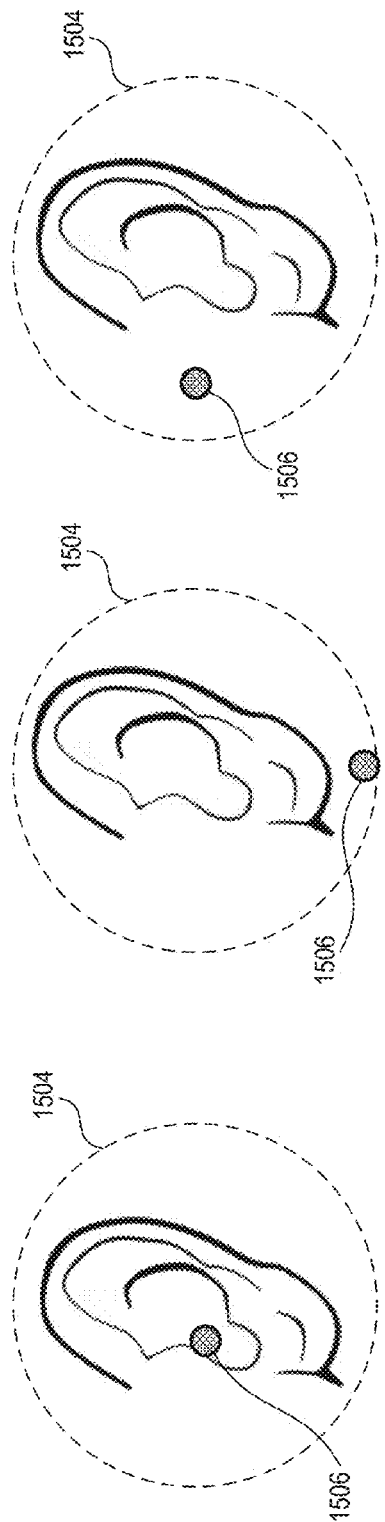
FIG. 15B
FIG. 15C
FIG. 15D
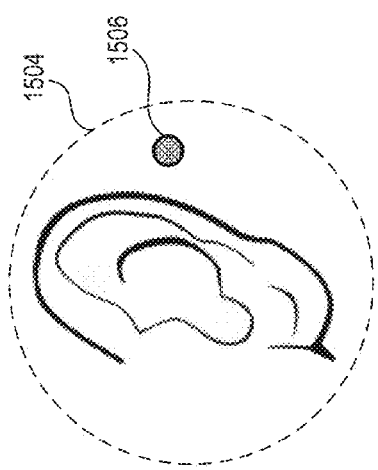
FIG. 15F
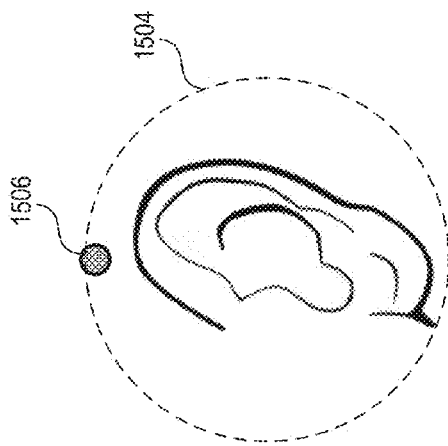
FIG. 15E

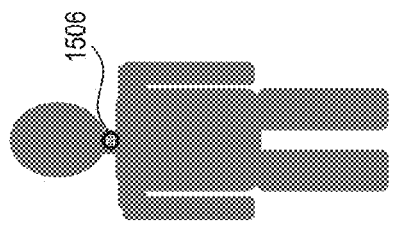
*FIG. 15I*
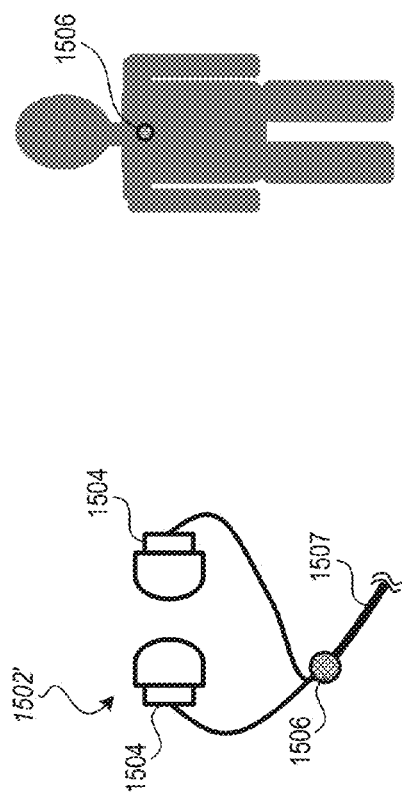
*FIG. 15H*
*FIG. 15G*
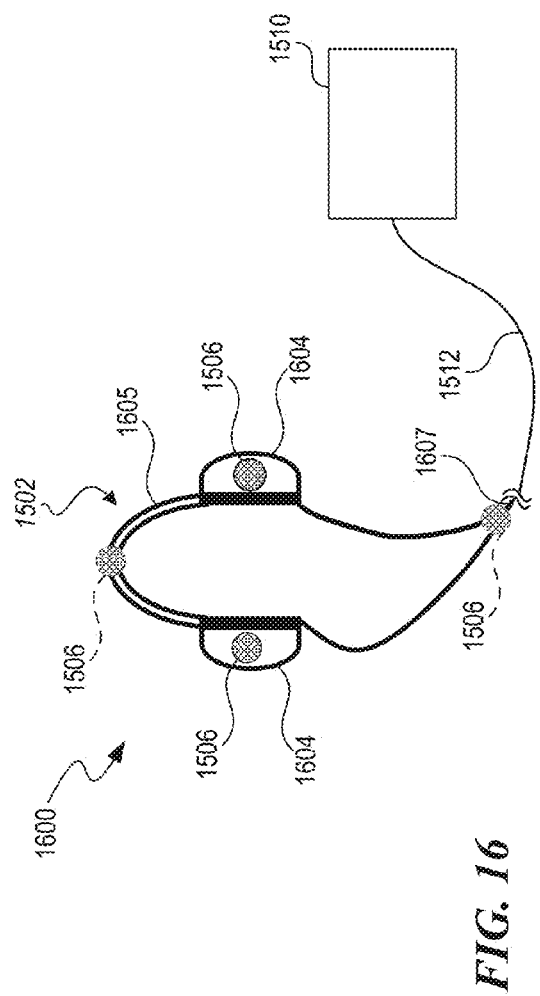
*FIG. 16*

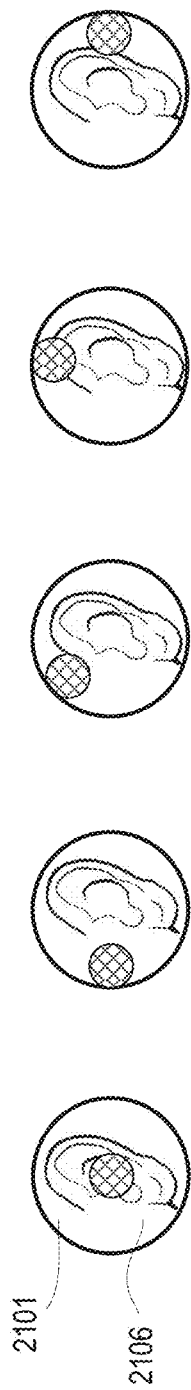
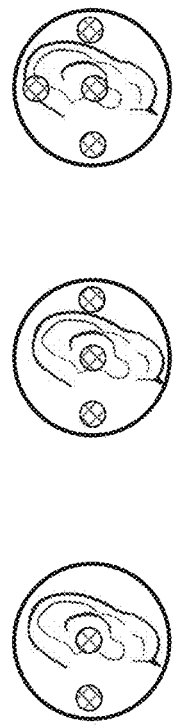
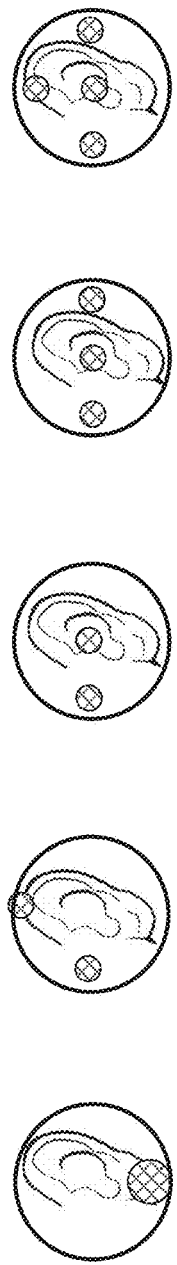
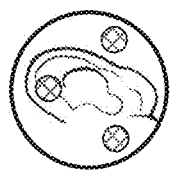
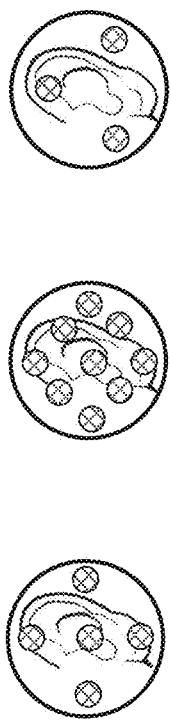
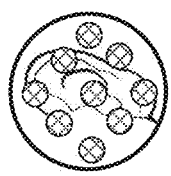
FIG. 22A  FIG. 22B  FIG. 22C  FIG. 22D  FIG. 22E
FIG. 22F  FIG. 22G  FIG. 22H  FIG. 22I  FIG. 22J
FIG. 22K  FIG. 22L  FIG. 22M

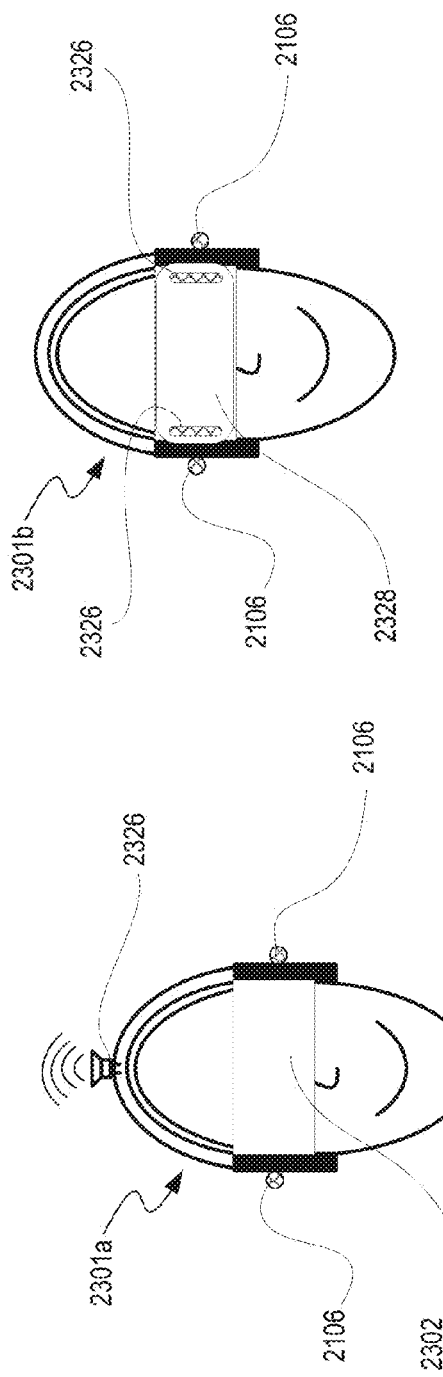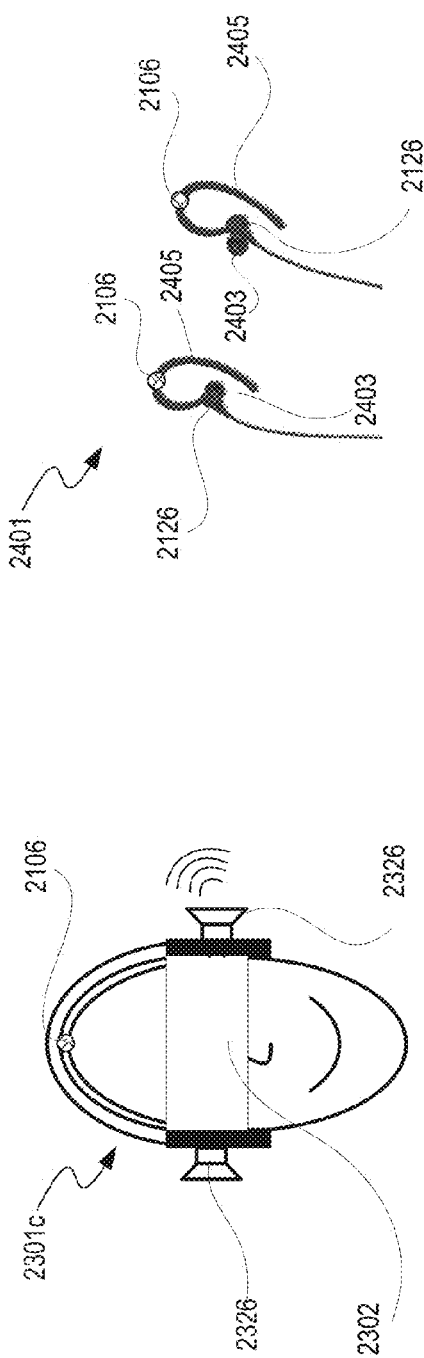

SYSTEMS AND METHODS OF CALIBRATING EARPHONES

CROSS-REFERENCED TO RELATED APPLICATION

This application claims priority to U.S. Provisional Patent Application No. 62/335,014, filed May 11, 2016, which is incorporated by reference herein in its entirety.

BACKGROUND

Acoustical waves interact with their environment through such processes including reflection (diffusion), absorption, and diffraction. These interactions are a function of the size of the wavelength relative to the size of the interacting body and the physical properties of the body itself relative to the medium. For sound waves, defined as acoustical waves traveling through air at frequencies within the audible range of humans, the wavelength is between approximately 1.7 centimeters and 17 meters. The human body has anatomical features on the scale of sound causing strong interactions and characteristic changes to the sound-field as compared to a free-field condition. A listener's ears (including the outer ear or pinna), head, and torso all interact with the sound, causing characteristic changes in time and frequency, called the Head Related Transfer Function (HRTF). The HRTF is related to the Head Related Impulse Response (HRIR) by a Fourier Transform. Variations in anatomy between humans may cause the HRTF to be different for each listener, different between each ear, and different for sound sources located at various locations in space (r, theta, phi) relative to the listener. These various HRTFs with position can facilitate localization of sounds.

BRIEF DESCRIPTION OF THE DRAWINGS

FIG. 5A is a schematic view of a sensor disposed adjacent an entrance of an ear canal configured in accordance with an embodiment of the disclosed technology.

FIG. 5B is a schematic view of a sensor disposed on a listening device configured in accordance with an embodiment of the disclosed technology.

FIG. 6 is a schematic view of a sensor disposed on an alternative listening device configured in accordance with an embodiment of the disclosed technology.

FIG. 7 shows schematic views of different head shapes.

FIGS. 8A-8D are schematic views of listening devices having measurement sensors.

FIGS. 11A-11C are schematic views of optical calibration methods.

FIG. 12 is a schematic view of an acoustic measurement.

FIGS. 15B-15F are cutaway side schematic views of various transducer locations in accordance with embodiments of the disclosed technology.

FIG. 15G is a schematic view of a listening device configured in accordance with another embodiment of the disclosed technology.

FIGS. 15H and 15I are schematic views of measurement configurations in accordance with embodiments of the disclosed technology.

FIG. 16 is a schematic view of a measurement system configured in accordance with another embodiment of the disclosed technology.

FIGS. 22A-22M are schematic views of various microphone positions in accordance with embodiments of the disclosed technology.

FIGS. 23A-C are schematic views of a head-mounted device configured in accordance with embodiments of the disclosed technology.

FIG. 24 is a schematic view of a listening device configured in accordance with an embodiment of the disclosed technology.

Figures 1A, 1B, 1C:
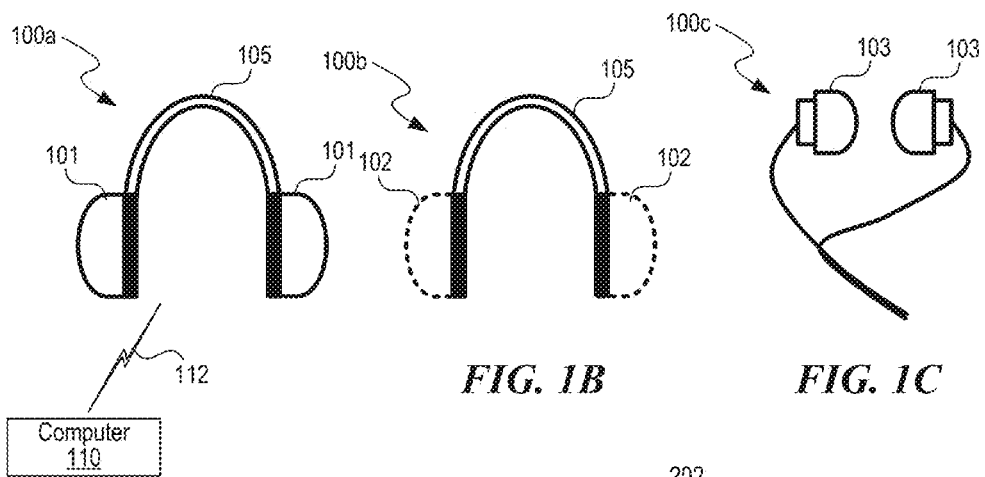
FIGS. 1A-1C are front schematic views of listening devices configured in accordance with embodiments of the disclosed technology.

Sizes of various depicted elements are not necessarily drawn to scale, and these various elements may be arbitrarily enlarged to improve legibility. As is conventional in the field of electrical device representation, sizes of electrical components are not drawn to scale, and various components can be enlarged or reduced to improve drawing legibility. Component details have been abstracted in the Figures to exclude details such as position of components and certain precise connections between such components when such details are unnecessary to the invention.

DETAILED DESCRIPTION

It is sometimes desirable to have sound presented to a listener such that it appears to come from a specific location in space. This effect can be achieved by the physical placement of a sound source (e.g., a loudspeaker) in the desired location. However, for simulated and virtual environments, it is inconvenient to have a large number of physical sound sources dispersed in an environment. Additionally, with multiple listeners in an environment, the relative locations of the sound sources to each listener is unique, causing a different experience of the sound; where one listener may be at the "sweet spot" of sound, another may be in a less optimal listening position. There are also conditions where the sound is desired to be a personal listening experience, so as to achieve privacy and/or not disturb others in the vicinity. In these situations, there is a need for sound that can be recreated either with a reduced number of sources, or through headphones and/or earphones, below referred to interchangeably and generically (e.g., headset, listening device, etc.). Recreating a soundfield of many sources with a reduced number of sources and/or through headphones requires knowledge of a listener's "HRTF" to recreate the spatial cues the listener uses to place sound in an auditory landscape.

The disclosed technology includes systems and methods of determining or calibrating a user's HRTF and/or "HRIR" to assist the listener in sound localization. The HRTF/HRIR is decomposed into theoretical groupings that may be addressed through various solutions, which can be used standalone or in combination. An HRTF and/or HRIR is decomposed into time effects, including inter-aural time difference (ITD), and frequency effects, which include both the inter-aural level difference (ILD) and spectral effects. ITD may be understood as difference in arrival time between the two ears (e.g., the sound arrives at the ear nearer to the sound source before arriving at the far ear.) ILD may be understood as the difference in sound loudness between the ears, and may be associated with the relative distance between the ears and the sound source and frequency shading associated with sound diffraction around the head and torso. Spectral effects may be understood as the differences in frequency response associated with diffraction and resonances from fine-scale features such as those of the ears (pinnae).

Conventional measurement of the HRTF places microphones in or near the listener's outer or external ear (also referred to as "pinna") at the blocked ear canal position, or in the ear canal directly. In this configuration, a test subject sits in an anechoic chamber and speakers are placed at several locations around the listener. An input signal is played over the speakers, and the microphones directly capture the signal at ear microphones. A difference in time, frequency, or amplitude is calculated between the input signal and the sound measured at the ear microphones. These measurements are typically performed in an anechoic chamber to capture only the listener's HRTF measurements and prevent measurement contamination from sound reflecting off of objects in the listener's natural surrounding environment. However, collection of these types of measurements is not convenient because a listener must go to a special facility equipped to conduct the measurements, and the individual measurement process is potentially very lengthy.

In some embodiments of the disclosed technology, a first and a second HRTF are respectively determined for a first and second part of the user's anatomy. A composite HRTF of the user is generated by combining portions of the first and second HRTFs. The first HRTF is calculated by determining a shape of the user's head. In some embodiments, a headset can include a first earphone having a first transducer and a second earphone having a second transducer; the first HRTF is determined by emitting an audio signal from the first transducer and receiving a portion of the emitted audio signal at the second transducer.

In some embodiments, the first HRTF is determined using an ITD and/or an ILD of an audio signal emitted from a position proximate to the user's head. In some embodiments, the first HRTF is determined using a first modality (e.g., dimensional measurements of the user's head), and the second HRTF is determined using a different, second modality (e.g., a spectral response of one or both the user's pinnae). In other embodiments, the listening device includes an earphone coupled to a headband, and the first HRTF is determined using electrical signals indicative of movement of the earphone from a first position to a second position relative to the headband. In certain embodiments, the first HRTF is determined by calibrating a first photograph of the user's head without a headset using a second photograph of the user's head wearing the headset. In still other embodiments, the second HRTF is determined by emitting sounds from a transducer spaced apart from the listener's ear in a non-anechoic environment and receiving sounds at a transducer positioned on an earphone configured to be worn in an opening of an ear canal of at least one of the user's pinnae.

In some embodiments of the disclosed technology, a computer program product includes a computer-readable storage medium (e.g., a non-transitory computer-readable medium) that stores computer-usable program code executable to perform operations for generating a composite HRTF of a user. The operations include determining a first HRTF of a first part of the user's anatomy and a second HRTF of a second part of the user's anatomy. Portions of the first and second HRTFs can be combined to generate the user's composite HRTF. In one embodiment, the operations further include transmitting the composite HRTF to a remote server. In some embodiments, the operations of determining the first HRTF include transmitting an audio signal to a first transducer on a headset worn by the user. A portion of the transmitted audio signal is received from a different, second transducer on the headset. In other embodiments, the operations of determining the first HRTF can also include receiving electrical signals indicative of movement of the user's head from a sensor (e.g., an accelerometer) worn on the user's head.

In yet other embodiments of the disclosed technology, a listening device configured to be worn on the head of a user includes a pair of earphones coupled via a band. Each of the earphones defines a cavity having an inner surface and includes a transducer disposed proximate to the inner surface. The device further includes a sensor (e.g., an accelerometer, gyroscope, magnetometer, optical sensor, acoustic transducer) configured to produce signals indicative of movement of the user's head. A communication component configured to transmit and receive data communicatively couples the earphones and the sensor to a computer configured to compute at least a portion of the user's HRTF.

In some embodiments, a listener's HRTF can be determined in natural listening environments. Techniques may include using a known stimulus or input signal for a calibration process that the listener participates in, or can involve using noises naturally present in the environment of the listener, where the HRTF can be learned without a calibration process for the listener. This information is used to create spatial playback of audio and to remove artifacts of the HRTF from audio recorded on/near the body. In one embodiment of the disclosed technology, a method of determining a user's HRTF includes receiving sound energy from the user's environment at one or more transducers carried by the user's body. The method can further include determining the user's HRTF using ambient audio signals without an external HRTF input signal using a processor coupled to the one or more transducers.

In another embodiment of the disclosed technology, a computer program product includes a computer-readable storage medium storing computer-usable program code executable by a processor to perform operations for determining a user's HRTF. The operations include receiving audio signals corresponding to sound from the user's environment at a microphone carried by the user's body. The operations further include determining the user's HRTF using the audio signals in the absence of an input signal corresponding to the sound received at the microphone.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but no other embodiments. Further, use of the passive voice herein generally implies that the disclosed system performs the described function.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various examples of the disclosed technology will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Suitable Environment

FIG. 1A is a front schematic view of a listening device 100*a* that includes a pair of earphones 101 (i.e., over-ear and/or on-ear headphones) configured to be worn on a user's head and communicatively coupled to a computer 110. The earphones 101 each include one or more transducers and an acoustically isolated chamber (e.g., a closed back). In some embodiments, the earphone 101 may be configured to allow a percentage (e.g., between about 5% and about 25%, less than 50%, less than 75%) of the sound to radiate outward toward the user's environment. FIGS. 1B and 1C illustrate other types of headphones that may be used with the disclosed technology. FIG. 1B is a front schematic view of a listening device 100*b* having a pair of earphones 102 (i.e., over-ear and/or on-ear headphones), each having one or more transducers and an acoustically open back chamber configured to allow sound to pass through. FIG. 1C is front schematic view of a listening device 100*c* having a pair of concha-phones or in-ear earphones 103.

Figure 2:
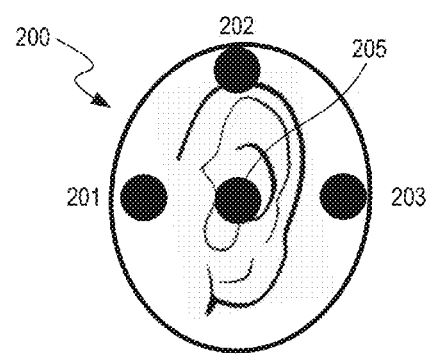
FIG. 2 is a side schematic diagram of an earphone of a listening device configured in accordance with an embodiment of the disclosed technology.

FIG. 2 is a side schematic diagram of an earphone 200 configured in accordance with an embodiment of the disclosed technology. In some embodiments, the earphone 200 is a component of the listening device 100*a* and/or the listening device 100 (FIGS. 1A-1C). Four transducers, 201-203 and 205, are arranged in front (201), above (202), behind (203), and on axis (205) with a pinna. Sounds transmitted from these transducers can interact with the pinna to create characteristic features in the frequency response, corresponding to a desired angle. For example, sound from transducer 201 may correspond to sound incident from 20 degrees azimuth and 0 degrees elevation, transducer 205 from 90 degrees azimuth, and transducer 203 from 150 degrees azimuth. Sound from transducer 202 may correspond to sound incident from 90 degrees azimuth and 60 degrees elevation. Other embodiments may employ a fewer or greater number of transducers, and/or may arrange the transducers at differing locations to correspond to different sound incident angles.

Figure 3:
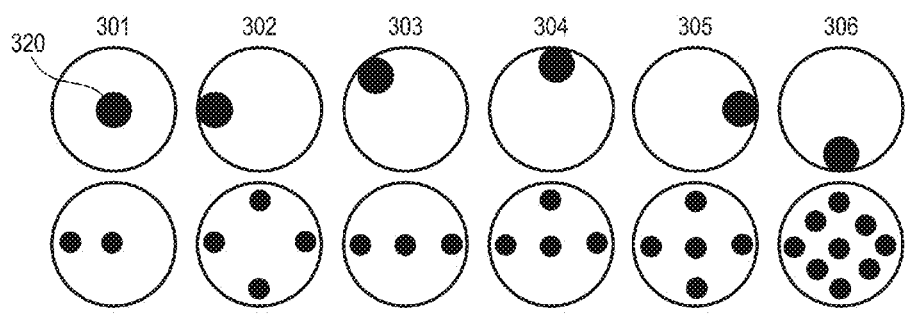
FIG. 3 shows side schematic views of a plurality of speaker devices configured in accordance with embodiments of the disclosed technology.

FIG. 3 shows earphones 301-312 with variations in number of transducers 320 and their placements within an ear cup. The placement of the transducers 320 in the X,Y,Z near the pinna in conjunction with range correction signal processing can mimic the spectral characteristic of sound from various directions. As described in further detail below with respect to FIG. 4A, in embodiments where the transducers 320 do not align with the desired source location, methods for positioning sources between transducer angles may be used. These methods may include, but are not limited to, amplitude panning and ambisonics. For the embodiment of FIG. 2, a source positioned at 55 degrees in the azimuth might have an impulse response measured or calculated for 55 degrees panned between transducers 201 and 205 to capture the best available spectral response. For transducer locations that do not align with the desired location, signal correction may be applied to remove acoustic cues associated with actual location, and the signal may include a partial or whole spectral HRTF cues from the desired location.

Suitable System

Referring again to FIG. 1A, the computer 110 is communicatively coupled to the listening device 100a via a communication link 112 (e.g., one or more wires, one or more wireless communication links, the Internet or another communication network). In the illustrated embodiment of FIG. 1A, the computer 110 is shown separate from the listening device 100a. In other embodiments, however, the computer 110 can be integrated within and/or adjacent the listening device 100a. Moreover, in the illustrated embodiment, the computer 110 is shown as a single computer. In some embodiments, however, the computer 110 can comprise several computers including, for example, computers proximate to the listening device 100a (e.g., one or more personal computers, personal digital assistants, mobile devices, tablets) and/or computers remote from the listening device 100a (e.g., one or more servers coupled to the listening device via the Internet or another communication network).

The computer 110 includes a processor, memory, non-volatile memory, and an interface device. Various common components (e.g., cache memory) are omitted for illustrative simplicity. The computer 110 is intended to illustrate a hardware device on which any of the components depicted in the example of FIG. 1A (and any other components described in this specification) can be implemented. The computer 110 can be of any applicable known or convenient type. The components of the computer 110 can be coupled via a bus or through some other known or convenient device.

The processor may be, for example, a conventional microprocessor such as an Intel microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed. The bus also couples the processor to the non-volatile memory and drive unit. The non-volatile memory is often a magnetic floppy or hard disk, a magneto-optical disk, an optical disk, a read-only memory (ROM), such as a CD-ROM, EPROM, or EEPROM, a magnetic or optical card, or another form of storage for large amounts of data. Some of this data is often written by a direct memory access process into memory during execution of software in the computer 110. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory herein. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered part of the computer system. The interface can include an analog modem, ISDN modem, cable modem, token ring interface, satellite transmission interface (e.g., "direct PC"), or other interfaces for coupling a computer system to other computer systems, including wireless interfaces (e.g., WWAN, WLAN). The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), LED, OLED, or some other applicable known or convenient display device. For simplicity, it is assumed that controllers of any devices not depicted reside in the interface.

In operation, the computer 110 can be controlled by operating system software that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct a more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the computer 110 operates as a standalone device or may be connected (e.g., networked) to other machines. In a networked deployment, the computer 110 may operate in the capacity of a server or a client machine in a client-server network environment or as a peer machine in a peer-to-peer (or distributed) network environment.

The computer 110 may be a server computer, a client computer, a personal computer (PC), a tablet, a laptop computer, a set-top box (STB), a personal digital assistant (PDA), a cellular telephone, a smartphone, wearable computer, home appliance, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an embodiment to be a single medium, the terms "machine-readable medium" and "machine-readable storage medium" should be taken to include a single medium or multiple media (e.g., a centralized or distributed database, and/or associated caches and servers) that store the one or more sets of instructions. The terms "machine-readable medium" and "machine-readable storage medium" shall also be taken to include any medium that is capable of storing, encoding, or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine- or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

HRTF and HRIR Decomposition

Figure 4A:
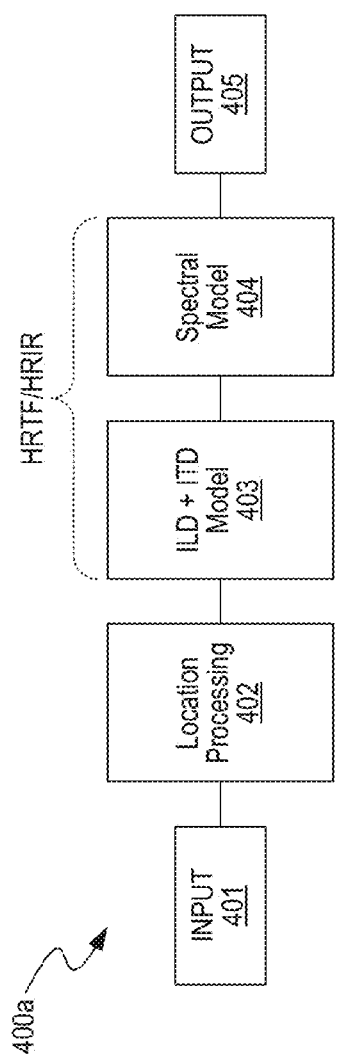
FIG. 4A is a flow diagram of a process of decomposing a signal in accordance with an embodiment of the disclosed technology.
Figure 4B:
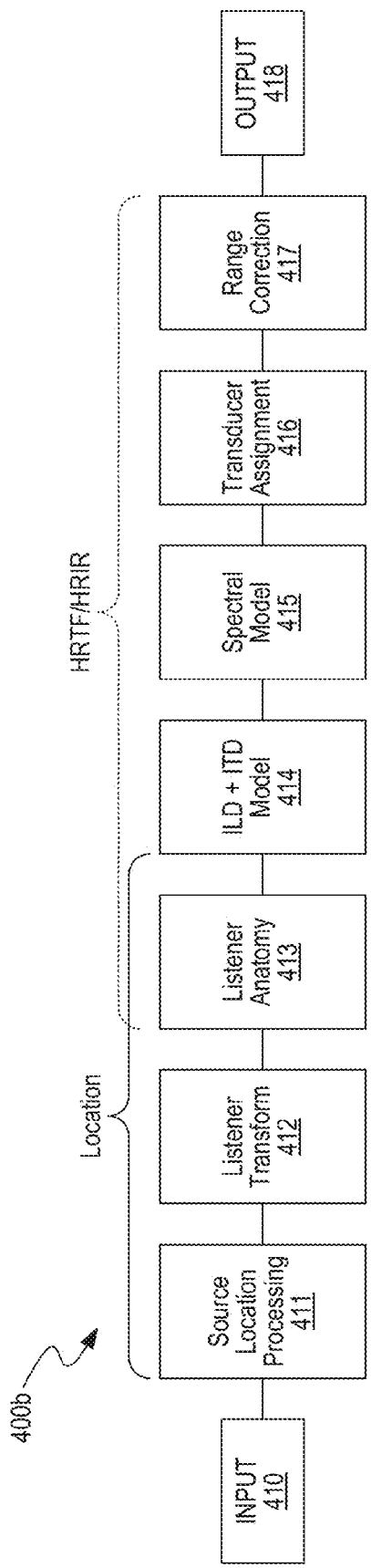
FIG. 4B is a flow diagram of a process of decomposing a signal in accordance with an embodiment of the disclosed technology.

FIGS. 4A and 4B are flow diagrams of processes 400*a* and 400*b*, respectively, of determining a user's HRTF/HRIR configured in accordance with embodiments of the disclosed technology. The processes 400*a* and 400*b* may include one or more instructions stored on memory and executed by a processor in a computer (e.g., the computer 110 of FIG. 1A).

Referring first to FIG. 4A, at block 401, the process 400*a* receives an audio signal from a signal source (e.g., a pre-recorded or live playback from a computer, wireless source, mobile device, and/or another audio source).

At block 402, the process 400*a* identifies a source location of sounds in the audio signal within a reference coordinate system. In one embodiment, the location may be defined as range, azimuth, and elevation $(r, \theta, \varphi)$ with respect to the ear entrance point (EEP) or a reference point to the center of the head, between the ears, may also be used for sources sufficiently far away such that the differences in $(r, \theta, \varphi)$ between the left and right EEP are negligible. In other embodiments, however, other coordinate systems and alternate reference points may be used. Further, in some embodiments, a location of a source may be predefined, as for standard 5.1 and 7.1 channel formats. In some other embodiments, however, sound sources may have arbitrary positioning, dynamic positioning, or user-defined positioning.

At block 403, the process 400*a* calculates a portion of the user's HRTF/HRIR using calculations based on measurements of the size of the user's head and/or torso (e.g., ILD, ITD, mechanical measurements of the user's head size, optical approximations of the user's head size and torso effect, and/or acoustical measurement and inference of the head size and torso effect). In block 404, the process 400*a* calculates a portion of the user's HRTF/HRIR using spectral components (e.g., near-field spectral measurements of a sound reflected from user's pinna). In the near-field, the location of a user's ears relative to a sound source is more significant in calculating an HRTF than in far-field sources (e.g., greater than 1.2 m) in which the center of the user's head can simply be used as a reference for the distance and angle of the sound source. For example, in the near-field, HRTF rapidly changes with distance due at least in part to ILD proximity effect. Thus, the process 400*a* can partially or fully adjust for this change by deconstructing the user's ear from the user's head and torso to track spectral effects that are sensitive to location (block 404). For example, the process 400*a* can determine characteristic effects for the user's head, shoulders, and ears when the sound is measured at a certain distance from the ear (e.g., 2 cm) by deconstructing the measurements into different HRTF components. These HRTF components allow for the reconstruction of a sound at a different distance or location than the measured calibration location. In addition to characteristic effects of the user's ears, head, and torso, the process 400a can reconstruct an HRTF to take into account the influence that transducers, mounting structures (e.g., a headphone), and/or other components proximate to the user's ears have on the measured calibration sound or the sound playback via the listening device (block 404). In some embodiments, the transducers of the listening device may not be in a typical location (e.g., at the entrance of the ear canal) and, therefore, the process 400a can modify the HRTF to take into account a translation to the desired position (e.g., at the entrance of the ear canal) (block 404). That is, the translation can modify the HRTF calculation based on an actual location of a transducer relative to the user's ear compared to the desired location of the transducer relative to the ear. For example, in embodiments where an earphone obstructs the concha and, thereby, influences the acoustic response, the process 400a can be used to reconstruct the acoustic response (an HRTF sub-component) as though the concha were unobstructed (assuming the size of the earphone is known). Blocks 403 and 404 are also discussed in more detail below in reference to FIG. 4B.

Figure 20:
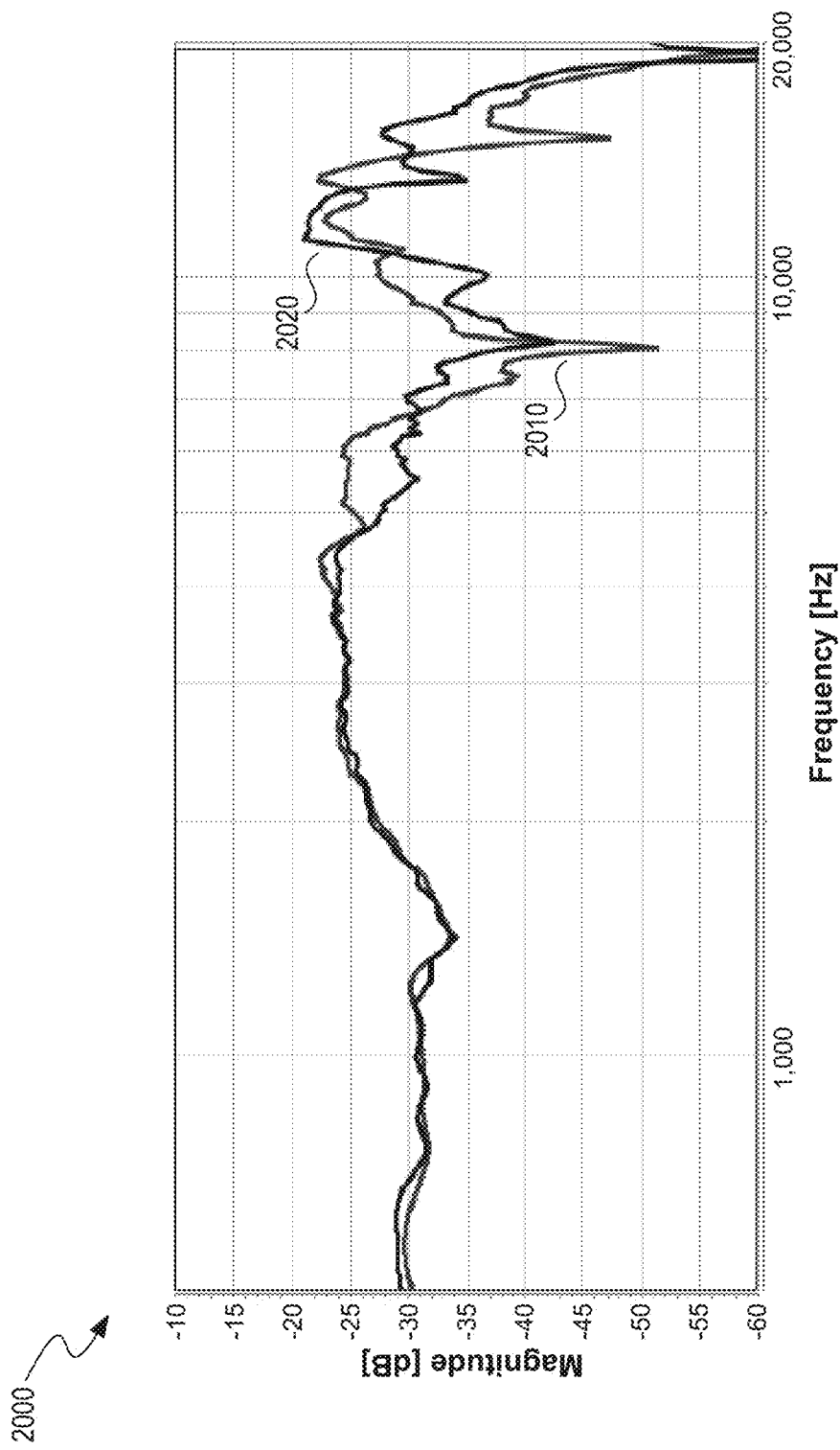
FIG. 20 is a graph of a frequency response of output signals.

At block 405, the process 400a combines portions of the HRTFs calculated at blocks 403 and 404 to form a composite HRTF for the user. The composite HRTF may be applied to an audio signal that is output to a listening device (e.g., the listening devices 100a, 100b, and/or 100c of FIGS. 1A-1C). The composite HRTF may also undergo additional signal processing (e.g., signal processing that includes filtering and/or enhancement of the processed signals) prior to being applied to an audio signal. FIG. 20 is a graph 2000 showing frequency responses of output signals 2010 and 2020 during playback of sound perceived to be directly in front of the listener (e.g., 0 degrees azimuth) having the composite HRTF applied thereto. Signal 2010 is the frequency response of the composite HRTF creating using embodiments described herein (e.g., using the process 400a described above). Signal 2020 is the HRTF frequency response captured at a listener's ear for a real sound source.

FIG. 4B is a flow diagram of a process 400b showing certain portions of the process 400a in more detail. At block 410, the process 400b receives an audio signal from a signal source (e.g., a pre-recorded or live playback from a computer, wireless source, mobile device, and/or another audio source).

At block 411, the process 400b determines location(s) of sound source(s) in the received signal. For example, the location of a source may be predefined, as for standard 5.1 and 7.1 channel formats, or may be of arbitrary positioning, dynamic positioning, or user-defined positioning.

At block 412, the process 400b transforms the sound source(s) into location coordinates relative to the listener. This step allows for arbitrary relative positioning of the listener and source, and for dynamic positioning of the source relative to the user, such as for systems with head/positional tracking.

At block 413, the process 400b receives measurements related to the user's anatomy from one or more sensors positioned near and/or on the user. In some embodiments, for example, one or more sensors positioned on a listening device (e.g., the listening devices 100a-100c of FIGS. 1A-1C) can acquire measurement data related to the anatomical structures (e.g., head size, orientation). The position data may also be provided by an external measurement device (e.g., one or more sensors) that tracks the listener and/or listening device, but is not necessary physically on the listening device. In the following, references to position data may come from any source except as their function is related specifically related to an exact location on the device. The process 400b can process the acquired data to determine orientations and positions of sound sources relative to the actual location of the ears on the head of the user. For example, process 400b may determine that a sound source is located at 30 degrees relative to the center of the listener's head with 0 degrees elevation and a range of 2 meters, but to determine the relative positions to the listener's ears, the size of the listener's head and the location of the ears on that head may be used to increase the accuracy of the model and determine HRTF/HRIR angles associated with the specific head geometry.

At block 414, the process 400b uses information from block 413 to scale or otherwise adjust the ILD and ITD to create an HRTF for the user's head. A size of the head and location of the ears on the head, for example, can affect the path length (time-of-flight) and diffraction of sound around the head and body, and ultimately what sound reaches the ears.

At block 415, the process 400b computes a spectral model that includes fine-scale frequency response features associated with the pinna to create HRTFs for each of the user's ears, or a single HRTF that can be used for both of the user's ears. Acquired data related to user's anatomy received at block 413 may be used to create the spectral model for these HRTFs. The spectral model may also be created by placing transducer(s) in the near-field of the ear, and reflecting sound off of the pinna directly.

At block 416, the process 400b allocates processed signals to the near and far ear to utilize the relative location of the transducers to the pinnae. Additional details and embodiments are described in the Spectral HRTF section below.

At block 417, the process 400b calculates a range or distance correction to the processed signals that can compensate for additional head shading in the near-field and differences between near-field transducers in the headphone and sources at larger range, and/or may be applied to correct for a reference point at the center of the head versus the ear entrance reference point. The process 400b can calculate the range correction, for example, by applying a predetermined filter to the signal and/or including reflection and reverberation cues based on environmental acoustics information (e.g., based on a previously derived room impulse response). For example, the process 400b can utilize impulse responses from real sound environments or simulated reverberation or impulse responses with different HRTFs applied to the direct and indirect (reflected) sound, which may arrive from different angles. In the illustrated embodiment of FIG. 4B, block 417 is shown after block 416. In other embodiments, however, the process 400b can include range correction(s) at any of the blocks shown in FIG. 4B and/or at one or more additional steps not shown. Moreover, in other embodiments, the process 400b does not include a range correction calculation step.

At block 418, the process 400b terminates. In some embodiments, processed signals may be transmitted to a listening device (e.g., the listening devices 100a, 100b, and/or 100c of FIGS. 1A-1C) for audio playback. In other embodiments, the processed signals may undergo additional signal processing (e.g., signal processing that includes filtering and/or enhancement of the processed signals) prior to playback.

FIG. 5A shows a microphone 501 that may be positioned near the entrance to the ear canal. This microphone may be used in combination with a speaker source near the listener (e.g., within about 1 meter) to directly measure the HRTF/HRIR acoustically. Notably, this may be done in a non-anechoic environment. Additionally, translation for range correction may be applied. One or more sensors may be used to track the relative locations of the source and microphone. In one embodiment, a multi-transducer headphone can be paired with the microphone 501 to capture a user's HRTF/HRIR in the near-field. FIG. 5B illustrates an embodiment in which a transducer 510 (e.g., a microphone) is included on a body 503 (e.g., a listening device, an in-ear earphone). The transducer 510 can be used to capture the HRTF/HRIR, either with an external speaker, or with the transducer(s) in the headphone. In some embodiments, the transducer 501 may be used to directly measure a user's whole or partial HRTF/HRIR. FIG. 6 shows a sensor, 601, that is located in/on an earphone 603. This sensor may be used to acoustically and/or visually scan the pinna.

ILD and ITD

The ILD and ITD are influenced by the user's head and torso size and shape. The ILD and ITD may be directly measured acoustically or calculated based on measured or arbitrarily assigned dimensions. FIG. 7 shows a plurality of representative shapes 701-706 from which the ILD and ITD model may be measured or calculated. The ILD and ITD may be represented by HRIR without spectral components, or may be represented by frequency domain shaping/filtering and time delay blocks. The shapes 701 and 702 generally corresponds to a human head with pinnae, which combines the ITD, ILD, and spectral components. The shapes 703 to 706 generally corresponds to a human head without pinnae. The HRTF/HRIR may be measured directly from the cast of a head with the pinnae removed, or calculated from a model. The shapes 703, 704, and 705 correspond respectively to a prolate spheroid, an oblate spheroid, and a sphere. These shapes may be used to approximate the shape of a human head. The shape 706 is a representation of an arbitrary geometry in the shape of a head. As with shapes 702-705, shape 706 may be used in a computational/mathematical model, or directly measured from a physical object. The arbitrary geometry may also refer to mesh representation of a head with varying degrees of refinement. One skilled in the art may see the extension of the head model. In the illustrated embodiment of FIG. 7, shapes 701-706 generally represent a human head. In other embodiments, however, shapes that incorporate other anatomical portions (e.g., a neck, a torso) may also be included.

ILD and ITD Customization

The ILD and ITD may be customized by direct measurement of head geometries and inputting dimensions into a model such as shapes 702-706 of FIG. 7 or by selecting from a set of HRTF/HRIR measurements. The following methods are methods to contribute to ILD and ITD. Additionally, information gathered may be used for headphone modification to increase comfort.

FIGS. 8A-D, 9A-F, 10A-C, and 11A-C diagrammatically represent methods of head size and ear location through electromechanical, acoustical, and/or optical methods, respectively in accordance with embodiments of the present disclosure. Each method may be used in isolation or in conjunction with other methods to customize a head model for ILD and ITD. FIGS. 8A-8D, for example, illustrate measurements of human head width using one or more sensors (e.g., accelerometers, gyroscopes, transducers, cameras) configured to acquire data and transmit the acquired data to a computing system (e.g., the computer 110 of FIG. 1A) for use in calculating a user's HRTF (e.g., using the process 400a of FIG. 4A and/or the process 400b of FIG. 4B). The one or more sensors may also be used to improve head tracking.

Referring first to FIG. 8A, a listening device 800 (e.g., the listening device 100a of FIG. 1A) includes a pair of earphones 801 coupled via headband 803). In the illustrated embodiment, a sensor 805 (e.g., accelerometers, gyroscopes, transducers, cameras, magnetometers) is positioned on each earphone 801 can be used to acquire data relating to the size of the user's head. As the user rotates his or her head, for example, positional and rotational data is acquired by the sensors 805. The distance from each of the sensors 805 to the head is predetermined by the design of the listening device 800. The width of the head—a combination of a first distance r1 and a second distance r2—is calculated by using the information from both sensors 805 as they rotate around a central axis that is substantially equidistant to either sensor 805.

FIG. 8B shows another embodiment of the listening device 800 showing two of the sensors 805 located at different locations on a single earphone 801. In the illustrated embodiment, the first distance r1 and a third distance r11 (i.e., a distance between the two sensors 805) can be computed with the rotation, wherein the width of the head is calculated by twice the first distance. In other embodiments, the sensors 805 may be placed at any location on the listening device 800 (e.g., on the headband 803, on a microphone boom (not shown)).

FIG. 8C shows another embodiment having a single sensor 805 used to calculate head width. The rotation about the center may be used to determine the first distance r1. In some embodiments, a filter may be applied to correct for translation. The width of the head is approximately twice the first distance. FIG. 8D shows yet another embodiment of the headphone 800 with an additional sensor 805 disposed on the headband 803.

Spectral Self-Calibration

FIGS. 9A-11C generally show methods of auto-measurement of head size and ear location for the purposes of customization of HRTF/HRIR to ILD and ITD. The spectral component of the HRTF/HRIR may additionally be measured by methods shown in FIGS. 5, 6, and 11. These data may be combined to recreate the full HRTF/HRIR of the individual for playback on any headphone or earphone. The spectral HRTF can be broken into contributions from the pinnae and range correction for distance. Additionally, methods for reduction of reflections within the ear cup are used to suppress spectral disturbances not due to the pinnae, as they may distract from the HRTF.

FIGS. 9A-9F are schematic views of the listening device 100a (FIG. 1A) showing examples of measurement techniques to determine a size of a user's head. Referring FIG. 9A-9F together, in some embodiments, the size of the user's head can be determined using a distance 901 (FIG. 9A) between the earphones 101 when the listening device 100a is worn on the user's head. In some embodiments, the size of the user's head can be determined using an amount of flexing and/or bending at a first location 902a and a second location 902b (FIG. 9B) on the headband 105. For example, one or more electrical strain gauges in the headband sense a strain on a spring of the headband and provide a signal to a processor, which then computes (e.g., via a lookup table or algorithmically) a size for the user's head.

Figure 9A:
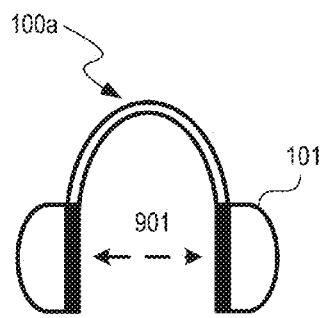
FIGS. 9A-9F are schematic views of listening device measurement methods.
Figure 9B:
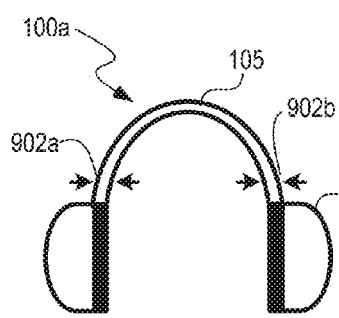
Figure 9C:
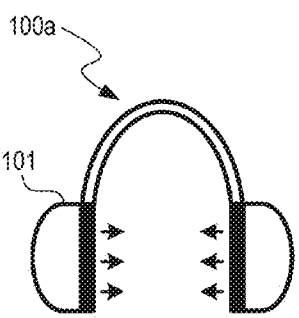
Figure 9D:
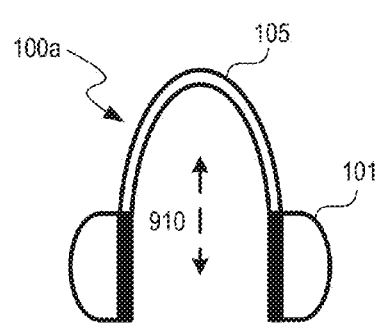
Figure 9E:
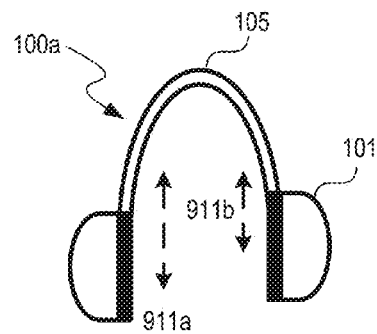
Figure 9F:
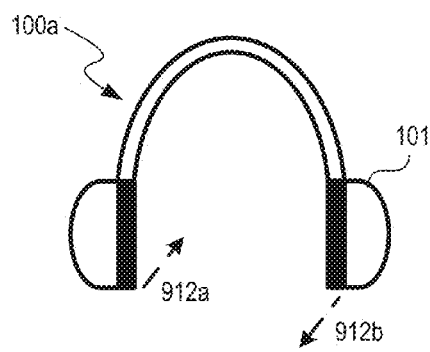

In some embodiments, the size of the user's head can be determined by determining an amount of pressure exerted by the wearer's head onto the corresponding left and right earphones 101 (indicated by arrows shown in FIG. 9C). For example, one or more pressure gauges at the ear cups sense a pressure of the headphones on the user's head and provide a signal to a processor, which then computes (e.g., via a lookup table or algorithmically) a size for the user's head. In some embodiments, the size of the wearer's head can be determined by determining a height 910 (FIG. 9D) of a center portion of the headband 105 relative to the earphones 101. For example, one or more electrical distance measurement transducers (akin to electrical micrometers) in the headband measure a displacement of the headband and provide a signal to a processor, which then computes (e.g., via a lookup table or algorithmically) the height. In some embodiments, the size of the wearer's head can be determined by determining a first height 911a (FIG. 9E) and a second height 911b of a center portion of the headband 105 relative to the corresponding left and right earphones 101. Determining the first height 911a and the second height 911b can compensate, for example, asymmetry of the wearer's head and/or uneven wear of the headphones 100a. For example, left and right electrical distance measurement transducers in the headband measure left and right displacements of the headband/ear cups and provide left and right signals to a processor, which then computes (e.g., via a lookup table or algorithmically) the height.

In some embodiments, the location of the ears and whether they are symmetrically located on the head may be determined by a rotation of ear cup and by a first deflection 912a (FIG. 9F) and a second deflection 912b of the corresponding left and right earphones 101 when worn on the user's head relative to the respective orientations when the earphones are not worn on the user's head. For example, the rotation of the ear cups and/or deflections can be measured (e.g., via location sensors, pressure sensors, etc.) to indicate the relative position of the user's ears (and thus the individual ear cups). If the front of the user is 0°, the ears would be symmetric relative to each other and the front of the user if located at 90° and 270°. However, rotation of the ear cup can indicate that the ears are slightly back from the typical position (e.g., earphones at 100° and 260°) or asymmetric (e.g., earphones at 90° and 260°). The measured rotation and deflection information can be used to account for these user-specific features to adjust an HRTF calculation. The dimensions and measurements described above with respect to FIGS. 9A-9F can be obtained or captured using one or more sensors on and/or in the listening device 100a and transmitted to the computer 100 via communication link 112 (FIG. 1A). In some embodiments, however, measurements performed using other suitable methods (e.g., measuring tape, hat size) may be entered manually into a model.

Figure 10C:
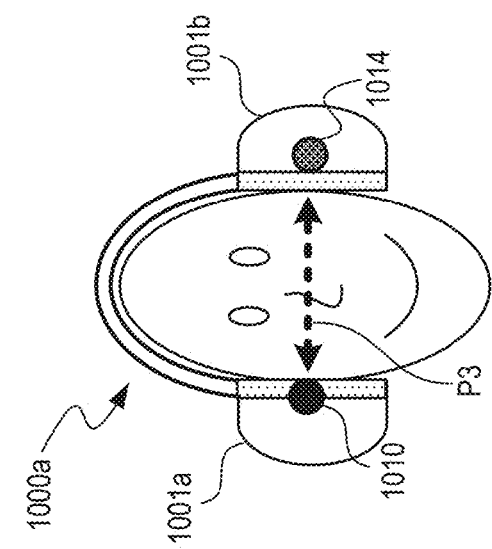
FIGS. 10A-10C are schematic views of listening device measurement methods.
Figure 10B:
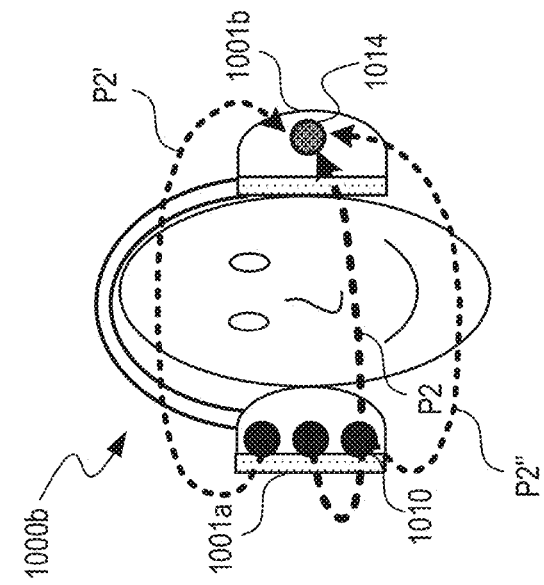
Figure 10A:
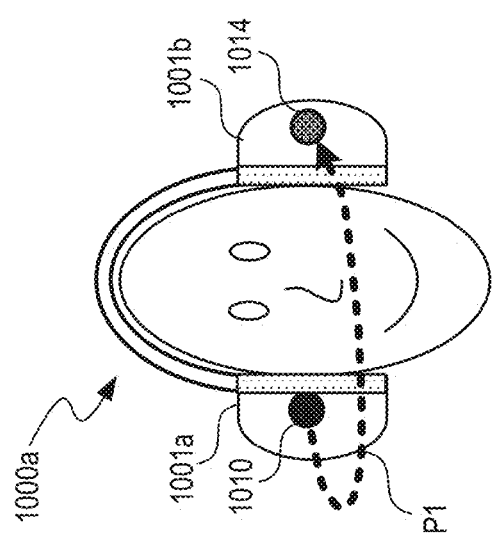

FIGS. 10A-10C are schematic views of head size measurements using acoustical methods. Referring first to FIGS. 10A and 10B, a headphone 1000a (e.g., the listening device 100a of FIG. 1A) includes a first earphone 1001a (e.g., a right earphone) and a second earphone 1001b (e.g., a left earphone). In the illustrated embodiments, the first earphone 1001a includes a speaker 1010 and the second earphone 1001b includes a microphone 1014. A width of the user's head can be measured by determining a delay between the transmission of a sound emitted by the speaker 1010 and the receiving of the sound at the microphone 1014. As discussed in further detail below with respect to FIGS. 15A-15I and 16, the speaker 1010 and the microphone 1014 can be placed at other locations (e.g., on a headband, a cable and/or a microphone boom) on and/or near the headphone 1000a. A sound path P1 (FIG. 10A) is one example of a path that sound emitted from the speaker 1010 can propagate around the user's head toward the microphone 1014. Transcranial acoustic transmission (FIG. 10B) along a path P2' through the user's head can also be used to measure dimensions of the user's head. Measuring sound along multiple path lengths P2, P2', and P2" is expected to result in more accurate measurements of dimensions of the user's head. Referring next to FIG. 10C, a headphone 1000a can include a rotatable earphone having a plurality of the speakers 1010. "In some embodiments, the microphone 1014 captures a portion of the HRTF associated with the torso and neck using reflection cues from the body that affect the microphone measurements of the user's head.

FIGS. 11A and 11B are schematic views of an optical method for determining dimensions of a user's head, neck, and/or torso. A camera 1102 (e.g., a camera located on a smartphone or another mobile device) captures one or more photographs of a user's head 1101 with a headphone 1000a (FIG. 11A) and without the headphone 1000b (FIG. 11B). The photographs can be transmitted to a computer (e.g., the computer 110 via communication link 112 of FIG. 1A) that can calculate dimensions of the user's head and/or determine ear locations based on a known catalog of reference photographs and predetermined headphone dimensions. In some embodiments, objects having a first shape 1110 or a second shape 1111 (FIG. 11C) can be used for scale reference on the user for optical scaling of the user's head 1101 and/or other anatomical features (e.g., one or more pinna, shoulders, neck, torso).

FIG. 12 shows a speaker 1202 positioned a distance D (e.g., 1 meter or less) from a listener 1201. The speaker 1202 may include one or more standalone speakers and/or one or more speakers integrated into another device (e.g., a mobile device such as a tablet or smartphone). The speaker 1202 may be positioned at predefined locations and the signal may be received by a microphone 1210 (e.g., the microphone 510 positioned on the earpiece 503 of FIG. 5B) placed in the ear. In some embodiments, the entire HRTF/HRIR of the listener can be calculated using data captured with the pairing of the speaker 1202 and microphone 1210. Alternately, if the acoustical data is deemed unsuitable, as may be caused by reflections in a non-anechoic environment, the data may be processed. The processing may consist of gating to capture the high-frequency spectral information. This information may be combined with a low-frequency model for a full HRTF/HRIR. Alternately, the acoustical information may be used to pick a less noisy model from a database of known HRTF/HRIRs. Sensor fusion may be used to define the most likely features and to select or calculate for spectral information. Additionally, translation for range correction may be applied, and a sensor(s) may be used to track the relative location of the source and microphone.

Self-Calibration and Sharing

Figure 13:
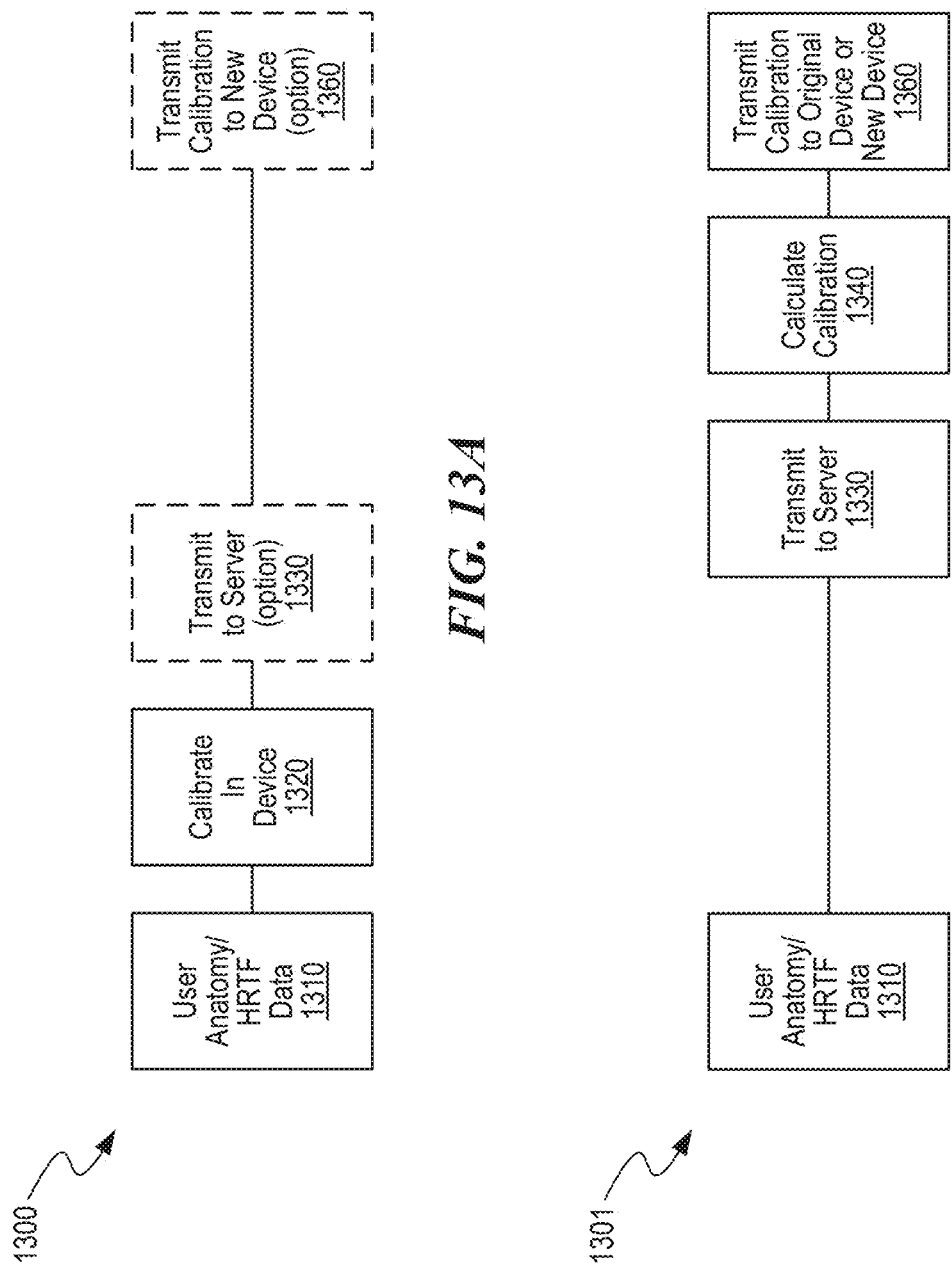
FIGS. 13A and 13B are flow diagrams for data calibration and transmission.

FIGS. 13A and 13B are flow diagrams of processes 1300 and 1301, respectively. The processes 1300 and 1301 can include, for example, instructions stored in memory (e.g., a computer-readable storage medium) and executed by one or more processors (e.g., memory and one or more processors in the computer 110 of FIG. 1A). The processes 1300 and 1301 can be configured to measure and use portions of the user's anatomy such as, for example, the user's head size, head shape, ear location, and/or ear shape to create separate HRTFs for portions of the user's anatomy. The separate HRTFs can be combined to form composite, personalized HRTFs/HRIRs that may be used within the headphone, and or may be uploaded to a database. The HRTF data may be applied to headphones, earphones, and loudspeakers that may or may not have self-calibrating features. Methods of data storage and transfer may be applied to automatically upload these parameters to a database.

Referring first to FIG. 13A, at block 1310 the process 1300 calculates one or more HRTFs of one or more portions of a user's anatomy and forms a composite HRTF for the user (e.g., as described above with reference to FIGS. 4A and 4B). At block 1320, the process 1300 uses the HRTF to calibrate a listening device worn by the user (e.g., headphones, earphones, etc.) by applying the user's composite HRTF to an audio signal played back via the listening device. In some embodiments, the process 1300 filters the audio signal using the user's composite HRTF. In some embodiments, the process 1300 can split the audio signal into one or more filtered signals that are allocated for playback in specific transducers on the listening device based on the user's HRTF and/or an arrangement of transducers on the listening device. The process 1300 can optionally include blocks 1330 and 1360, which are described in more detail below with reference to FIG. 13B. At block 1330, for example, the process 1300 can transmit the HRTF calculated at block 1310 to a remote server via a communication link (e.g., the communication link 112 of FIG. 1A, a wire, a wireless radio link, the Internet, and/or another suitable communication network or protocol). At block 1360, for example, the process 1300 can transmit the HRTF calculated at block 1310 to a different listening device worn by the same user and/or a different user having similar anatomical features. In some embodiments, for example, a user may reference database entries of HRTFs of users having similar anatomical shapes and sizes (e.g., similar head size, head shape, ear location, and/or ear shape) to select a custom HRTF/HRIR. The HRTF data may be applied to headphones, earphones, and loudspeakers that may or may not have self-calibrating features.

Referring next to FIG. 13B, at block 1310 the process 1301 calculates one or more HRTFs of one or more portions of a user's anatomy to generate a composite HRTF for the user, as described above in reference to FIG. 13A. At block 1330, the composite HRTF is transmitted to a server, as also described above in reference to FIG. 13A. At block 1340, the process 1301 calculates a calibration for a listening device worn by the user. The calibration can include allocation of portions of an audio signal to different transducers in the listening device. At block 1360, the process 1301 can transmit the calibration as described with reference to FIG. 13A.

Absorptive Headphone

Figure 14:
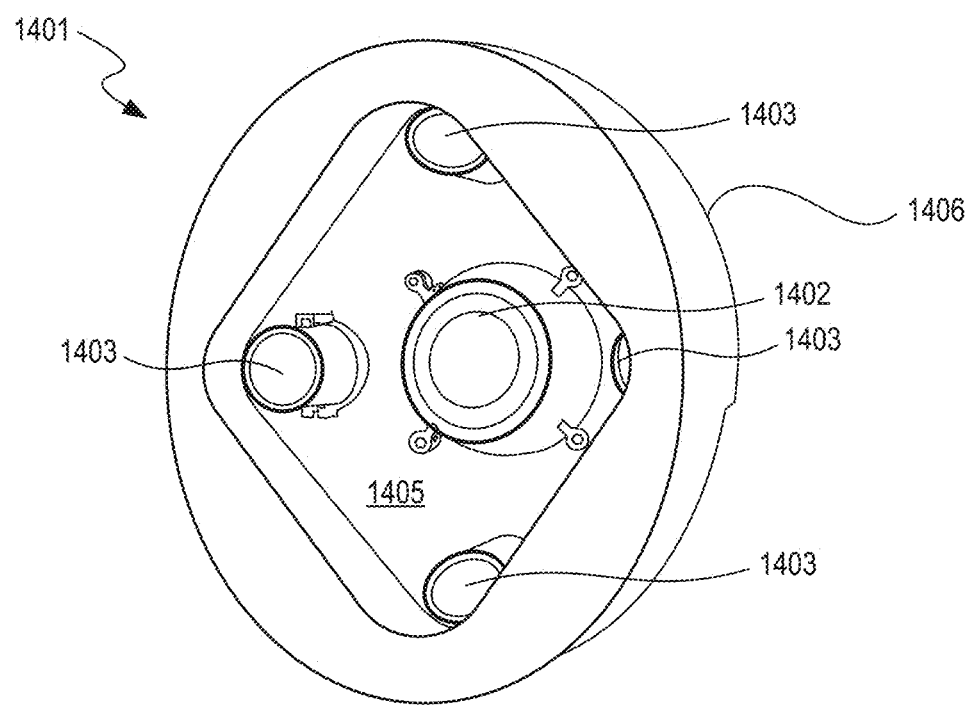
FIG. 14 is a rear cutaway view of an earphone.

FIG. 14 is rear cutaway view of a portion of an earphone 1401 (e.g., the earphones 101 of FIG. 1A) configured in accordance with embodiments of the disclosed technology. The earphone 1401 includes a center or first transducer 1402 surrounded by a plurality of second transducers 1403 that are separately chambered. An earpad 1406 is configured to rest against and cushion a user's ear when the earphone is worn on the user's head. An acoustic chamber volume 1405 is enclosed behind the first and second transducers 1402 and 1403. Many conventional headphones include large baffles and large transducers. As those of ordinary skill in the art would appreciate, these conventional designs can have resonances and/or standing waves that cause characteristic bumps and dips in the frequency response. For headphones that output 3D audio, resonances of the traditional headphone can be a distraction. In some embodiments, the volume 1405 may be filled with acoustically absorptive material (e.g., a foam) that can attenuate standing waves and damp unwanted resonances. In some embodiments, the absorptive material has an absorption coefficient between about 0.40 and 1.0 inclusive. In certain embodiments, the diameters of the transducers 1402 and 1403 (e.g., 25 mm or less) may be small relative to the wavelengths produced to remain in the piston region of operation to high frequencies preventing modal behavior and frequency response anomalies. In other embodiments, however, the transducers 1402 and 1403 have diameters of any suitable size (e.g., between about 10 mm and about 100 mm).

Calibration

Figure 15A:
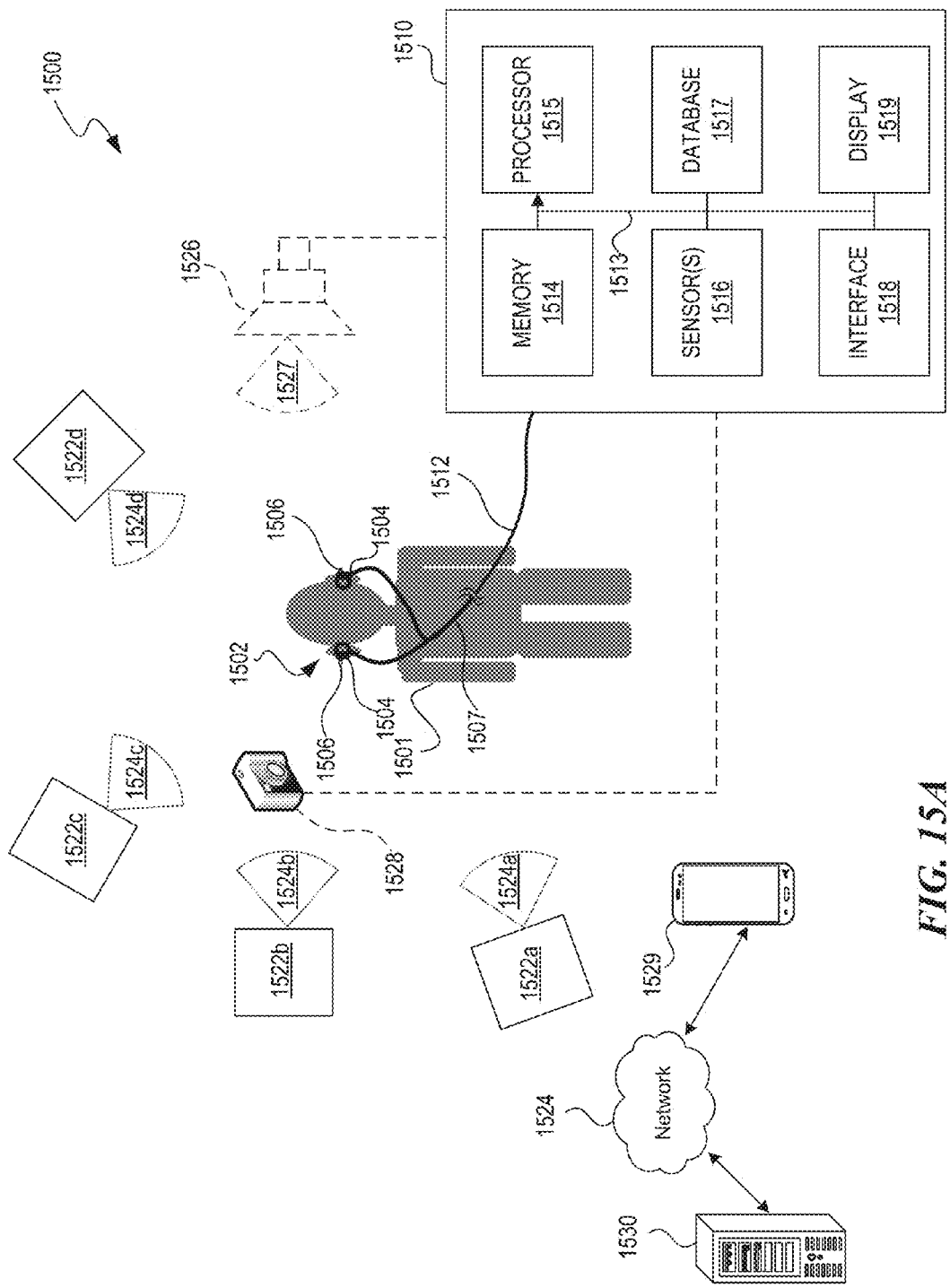
FIG. 15A is a schematic view of a measurement system configured in accordance with an embodiment of the disclosed technology.

FIG. 15A is a schematic view of a system 1500 having a listening device 1502 configured in accordance with an embodiment of the disclosed technology. FIGS. 15B-15F are cutaway side schematic views of various configurations of the listening device 1502 in accordance with embodiments of the disclosed technology. The location of the listening device 1502 may be understood to be around the ear in locations shown in FIGS. 15B-15F. FIG. 15G is a schematic view of a listening device 1502' configured in accordance with another embodiment of the disclosed technology. FIGS. 15H and 15I are schematic views of different measurement configurations in accordance with embodiments of the disclosed technology.

Referring to FIGS. 15A-15I together, the system 1500 includes a listening device 1502 (e.g., earphones, over-ear headphones, etc.) worn by a user 1501 and communicatively coupled to an audio processing computer 1510 (FIG. 15A) via a cable 1507 and a communication link 1512 (e.g., one or more wires, one or more wireless communication links, the Internet, or another communication network). The listening device 1502 includes a pair of earphones 1504 (FIGS. 15A-15F). Each of the earphones 1504 includes a corresponding microphone 1506 thereon. As shown in the embodiments of FIGS. 15B-15F, the microphone 1506 can be placed at a suitable location on the earphone 1504. In other embodiments, however, the microphone 1506 can be placed in and/or on another location of the listening device or the body of the user 1501. In some embodiments, the earphones 1504 include one or more additional microphones 1506 and/or microphone arrays. For example, in some embodiments, the earphones 1504 include an array of microphones at two or more of the locations of the microphone 1506 shown in FIGS. 15B-15F. In some embodiments, an array of microphones can include microphones located at any suitable location on or near the user's body. FIG. 15G shows the microphone 1506 disposed on the cable 1507 of the listening device 1502'. FIGS. 15H and 15I show one or more of the microphones 1506 positioned adjacent the user's chest (FIG. 15H) or neck (FIG. 15I).

The system 1500 can also include a mobile device 1529 (e.g., a smart phone, tablet, a wearable device (e.g., smart watch), a portable device specifically associated with the system 1500, etc.) configured to interact with the listening device 1502 and communicate with a network 1524. The system 1500 can also include a server 1530 that can communicate with the network 1524. In some embodiments, a listener can download a mobile application ("mobile app") from the server 1530 with the mobile device 1529 that assists the listener in calibrating the listening device 1502. For example, the user 1501 can download a mobile app using a smart phone and the mobile app can instruct the smart phone to emit sounds (e.g., predetermined sounds having predetermined frequencies, amplitudes) used for calibration of the listening device 1502. The listening device 1502, positioned proximate to the user's ear, can capture these emitted sounds with one or more microphones (e.g., the microphones 1506 of FIGS. 15B-15I), and the information received from the microphones can be used to calibrate the listening device 1502. For example, the listening device 1502 can send these captured sounds to the mobile device 1529 and/or the server 1530 or other backend system (via the network 1524 or the communications link 1512), which can analyze the recorded signals for listening device calibration. In various embodiments, the mobile app can instruct the listener to move the mobile device 1529 to different positions relative to the listening device 1502 for calibration purposes. For example, the mobile app can instruct the listener to move the mobile device 1529 in a circle around the listener as a sound is emitting from the mobile device 1529, the mobile app can instruct the listener to hold the mobile device 1529 directly in front of the listener as the sound is emitted, and/or move or hold the mobile device 1529 in one or more other orientations relative to the listening device 1502.

In some embodiments, the mobile device 1529 and/or other features of the system 1500 a camera 1528 that can collect location or position information about the listening device 1502 and the user 1501 by taking photos and/or videos of the user 1501 and/or the listening device 1502 during the listening device calibration process. The mobile device 1529 can process this positional information locally on the mobile device 1529 using digital signal processing algorithms or the mobile device 1529 can send the information to the server 1530 for processing via the network 1524. For example, the mobile app can record a video of the user 1501 as the user 1501 is performing a calibration test of the listening device 1502, and send this video to the server 1530 over the network 1524. The server 1530 can apply digital image processing algorithms (e.g., object recognition) to determine the location of the user 1501 relative to a sound emitting device (e.g., the mobile device 1529). The server 1530 can also send this information to the mobile device 1529 or another computer to be used in the determining the HRTF for a listener. In some embodiments, the mobile device 1529 can use the camera to determine the size and shape of a listener's head, body, torso, and/or other anatomical features of the user 1501.

In some embodiments, the mobile device 1529 can include accelerometer or motion sensor. The accelerometer or motion sensors can transmit location or motion information to the server 1530 or the mobile device 1529 can store and process the information locally. The mobile device 1529 can use data received from an accelerometer or motion sensor to determine a position of a sound emitted from the mobile device 1529. In some embodiments, the mobile device 1529 uses this information to calculate or modify an HRTF.

Although the mobile device 1529 can be used to calibrate the listening device 1502, other devices can be used to calibrate the listening device 1502. Other devices include, but are not limited to, a smart TV, a voice-recognition device (e.g., Amazon's Echo™), and/or other sound emitting devices that can interact with the listening device 1502. For example, a smart TV can execute a program or display instructions for a listener a user for calibrating. In some implementations, multiple devices, such as a smart TV and smart speakers, can be used to calibrate the listening device 1502. In such implementations, the user 1502 can use a mobile application to implement the process, where the mobile app can control and instruct the smart TV and smart speakers.

The network 1524 enables communication between devices in system 1500 and outside of system 1500 (e.g., via the Internet or an intranet). The network 1524 can include wireless networks such as, but not limited to, one or more of a Local Area Network (LAN), Wireless Local Area Network (WLAN), a Wide Area Network (WAN), Global System for Mobile Communications (GSM), Bluetooth, WiFi, Fixed Wireless Data, 2G, 2.5G, 3G, 4G, 5G, LTE networks, using messaging protocols such as TCP/IP, SMS, MMS, or any other wireless data networks or messaging services. The network 1524 may also include wired networks.

FIG. 16 is a schematic view of a system 1600 having a listening device 1602 configured in accordance with an embodiment of the disclosed technology. The listening device 1602 includes a pair of over-ear earphones 1604 communicatively coupled to the computer 1510 (FIG. 15A) via a cable 1607 and the communication link 1512 (FIG. 15A). A headband 1605 operatively couples the earphones 1604 and is configured to be received onto an upper portion of a user's head. In some embodiments, the headband 1605 can have an adjustable size to accommodate various head shapes and dimensions. One or more of the microphones 1506 is positioned on each of the earphones 1604. In some embodiments, one or more additional microphones 1506 may optionally be positioned at one or more locations on the headband 1605 and/or one or more locations on the cable 1607.

Referring again to FIG. 15A, a plurality of sound sources 1522a-d (identified separately as a first sound source 1522a, a second sound source 1522b, a third sound source 1522c, and a fourth sound source 1522d) emit corresponding sounds 1524a-d toward the user 1501. The sound sources 1522a-d can include, for example, automobile noise, sirens, fans, voices and/or other ambient sounds from the environment surrounding the user 1501. In some embodiments, the system 1500 optionally includes a loudspeaker 1526 coupled to the computer 1510 and configured to output a known sound 1527 (e.g., a standard test signal and/or sweep signal) toward the user 1501 using an input signal provided by the computer 1510 and/or another suitable signal generator. The loudspeaker can include, for example, a speaker in a mobile device, a tablet and/or any suitable transducer configured to produce audible and/or inaudible sound waves. In some embodiments, the system 1500 optionally includes an optical sensor or a camera 1528 coupled to the computer 1510. The camera 1528 can provide optical and/or photo image data to the computer 1510 for use in HRTF determination.

The computer 1510 includes a bus 1513 that couples a memory 1514, a processor 1515, one or more sensors 1515 (e.g., accelerometers, gyroscopes, transducers, cameras, magnetometers, galvanometers), a database 1517 (e.g., a database stored on non-volatile memory), a network interface 1518, and a display 1519. In the illustrated embodiment, the computer 1510 is shown separate from the listening device 1502. In other embodiments, however, the computer 1510 can be integrated within and/or adjacent to the listening device 1502. Moreover, in the illustrated embodiment of FIG. 15A, the computer 1510 is shown as a single computer. In some embodiments, however, the computer 1510 can comprise several computers including, for example, computers proximate to the listening device 1502 (e.g., one or more personal computers, personal data assistants, mobile devices, tablets) and/or computers remote from the listening device 1502 (e.g., one or more servers 1530 coupled to the listening device via the Internet or another communication network). Various common components (e.g., cache memory) are omitted for illustrative simplicity.

The computer system 1510 is intended to illustrate a hardware device on which any of the components depicted in the example of FIG. 15A (and any other components described in this specification) can be implemented. The computer 1510 can be of any applicable known or convenient type. In some embodiments, the computer 1510 and the computer 110 (FIG. 1A) can comprise the same system and/or similar systems. In some embodiments, the computer 1510 may include one or more server computers, client computers, personal computers, tablets, laptop computers, set-top boxes, personal digital assistants, cellular telephones, smartphones, wearable computers, home appliances, processors, telephones, web appliances, network routers, switches or bridges, and/or another suitable machine capable of executing a set of instructions (sequential or otherwise) that specify actions to be taken by that machine.

The processor 1515 may include, for example, a conventional microprocessor such as an Intel microprocessor. One of skill in the relevant art will recognize that the terms "machine-readable (storage) medium" or "computer-readable (storage) medium" include any type of device that is accessible by the processor. The bus 1513 couples the processor 1515 to the memory 1514. The memory 1514 can include, by way of example but not limitation, random access memory (RAM), such as dynamic RAM (DRAM) and static RAM (SRAM). The memory can be local, remote, or distributed.

The bus 1513 also couples the processor 1515 to the database 1517. The database 1517 can include a hard disk, a magneto-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1510. The database 1517 can be local, remote, or distributed. The database 1517 is optional because systems can be created with all applicable data available in memory. A typical computer system will usually include at least a processor, memory, and a device (e.g., a bus) coupling the memory to the processor. Software is typically stored in the database 1517. Indeed, for large programs, it may not even be possible to store the entire program in the memory 1514. Nevertheless, it should be understood that for software to run, if necessary, it is moved to a computer-readable location appropriate for processing, and for illustrative purposes, that location is referred to as the memory 1514 herein. Even when software is moved to the memory 1514 for execution, the processor 1515 will typically make use of hardware registers to store values associated with the software and local cache that, ideally, serves to speed up execution.

The bus 1513 also couples the processor to the interface 1518. The interface 1518 can include one or more of a modem or network interface. It will be appreciated that a modem or network interface can be considered part of the computer system. The interface 1518 can include an analog modem, ISDN modem, cable modem, token ring interface, satellite transmission interface (e.g., "direct PC"), or other interfaces for coupling a computer system to other computer systems. The interface 1518 can include one or more input and/or output devices. The I/O devices can include, by way of example but not limitation, a keyboard, a mouse or other pointing device, disk drives, printers, a scanner, and other input and/or output devices, including the display 1518. The display 1518 can include, by way of example but not limitation, a cathode ray tube (CRT), liquid crystal display (LCD), LED, OLED, or some other applicable known or convenient display device. For simplicity, it is assumed that controllers of any devices not depicted reside in the interface.

In operation, the computer 1510 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the database 1517 and/or memory 1514 and causes the processor 1515 to execute the various acts required by the operating system to input and output data and to store data in the memory 1514, including storing files on the database 1517.

In alternative embodiments, the computer 1510 operates as a standalone device or may be connected (e.g., networked) to other machines. In a networked deployment, the computer 1510 may operate in the capacity of a server or a client machine in a client-server network environment or as a peer machine in a peer-to-peer (or distributed) network environment.

Suitable Calibration Methods

Figure 17:
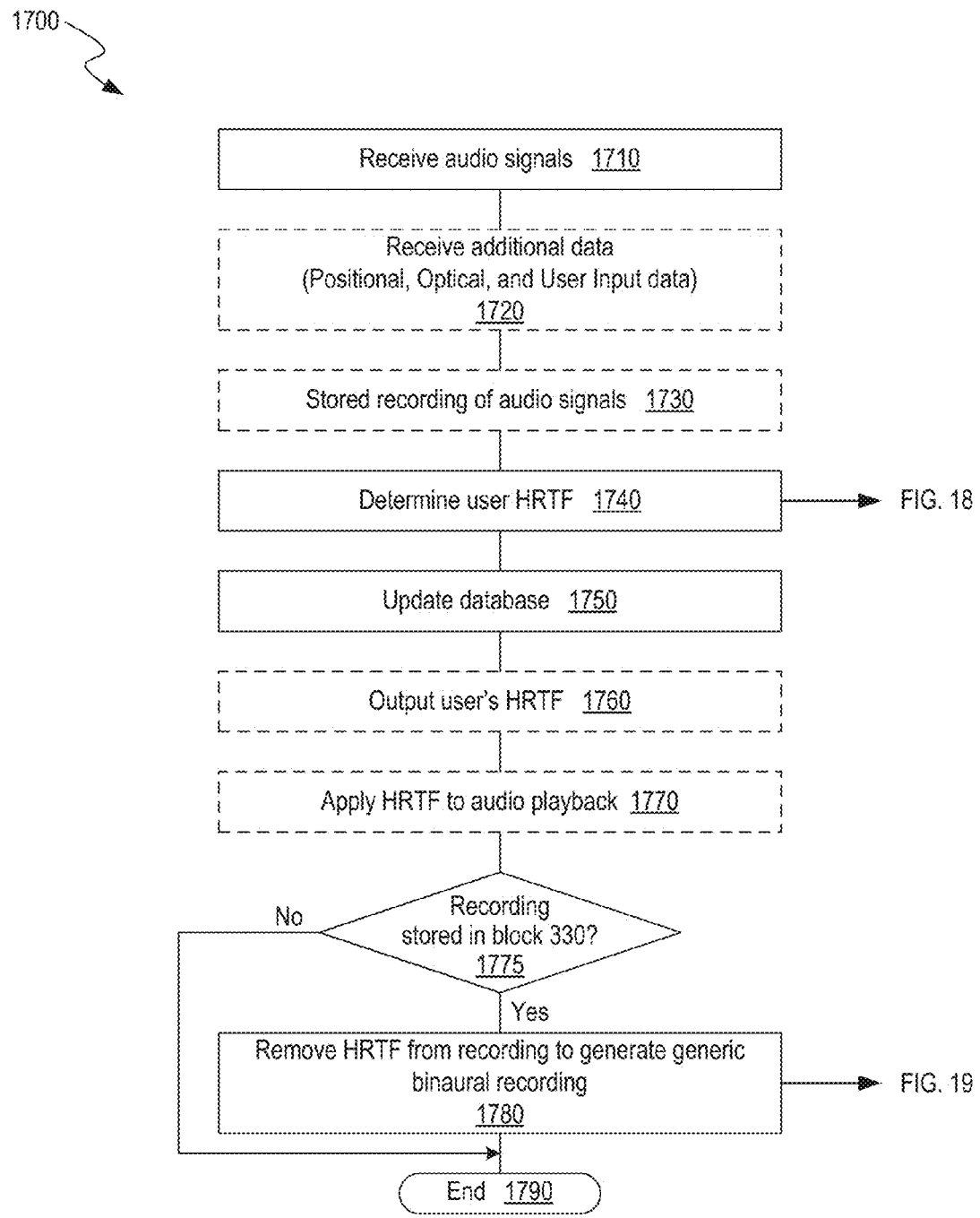
FIG. 17 is a flow diagram of an example process of determining a listener's Head Related Transfer Function.

FIG. 17 is a flow diagram of process 1700 for determining a user's HRTF configured in accordance with embodiments of the disclosed technology. The process 1700 may include one or more instructions or operations stored on memory (e.g., the memory 1514 or the database 1517 of FIG. 15A) and executed by a processor in a computer (e.g., the processor 1515 in the computer 1510 of FIG. 15A). The process 1700 may be used to determine a user's HRTF based on measurements performed and/or captured in an anechoic and/or non-anechoic environment. In one embodiment, for example, the process 1700 may be used to determine a user's HRTF using ambient sound sources in the user's environment in the absence of an input signal corresponding to one or more of the ambient sound sources.

At block 1710, the process 1700 receives electric audio signals corresponding to sound energy acquired at one or more transducers (e.g., one or more of the transducers 1506 on the listening device 1502 of FIG. 15A). The audio signals may include audio signals received from ambient noise sources (e.g., the sound sources 1522a-d of FIG. 15A) and/or a predetermined signal generated by the process 1700 and played back via a loudspeaker (e.g., the loudspeaker 1526 of FIG. 15A). Predetermined signals can include, for example, standard test signals such as a Maximum Length Sequence (MLS), a sine sweep, and/or another suitable sound that is "known" to the algorithm.

At block 1720, the process 1700 optionally receives additional data from one or more sensors (e.g., the sensors 1516 of FIG. 15A) including, for example, the location of the user and/or one or more sound sources. In one embodiment, the location of sound sources may be defined as range, azimuth, and elevation (r, θ, φ) with respect to the ear entrance point (EEP) or a reference point to the center of the head, between the ears, may also be used for sources sufficiently far away such that the differences in (r, θ, φ) between the left and right EEP are negligible. In other embodiments, however, other coordinate systems and alternate reference points may be used. Further, in some embodiments, a location of a source may be predefined, as for standard 5.1 and 7.1 channel formats. In some other embodiments, however, the sound sources may have arbitrary positioning, dynamic positioning, or user-defined positioning. In some embodiments, the process 1700 receives optical image data (e.g., from the camera 1528 of FIG. 15A) that includes photographic information about the listener and/or the environment. This information may be used as an input to the process 1700 to resolve ambiguities and to seed future datasets for prediction improvement. In some embodiments, the process 1700 receives user input data that includes, for example, the user's height, weight, length of hair, presence of glasses, shirt size, and/or hat size. The process 1700 can use this information during HRTF determination.

At block 1730, the process 1700 optionally records the audio data acquired at block 1710 and stores the recorded audio data into a suitable mono, stereo, and/or multichannel file format (e.g., mp3, mp4, way, OGG, FLAC, ambisonics, Dolby Atmos®, etc.). The stored audio data may be used to generate one or more recordings (e.g., a generic spatial audio recording). In some embodiments, the stored audio data can be used for post-measurement analysis.

At block 1740, the process 1700 computes at least a portion of the user's HRTF using the input data from block 1710 and (optionally) block 1720. As described in further detail below with reference to FIG. 18, the process 1700 uses available information about the microphone array geometry, positional sensor information, optical sensor information, user input data, and characteristics of the audio signals received at block 1710 to determine the user's HRTF or a portion thereof.

At block 1750, HRTF data is stored in a database (e.g., the database 1517 of FIG. 15A) as either raw or processed HRTF data. The stored HRTF may be used to seed future analysis, or may be reprocessed in the future as increased data improves the model over time. In some embodiments, data received from the microphones at block 1710 and/or the sensor data from block 1720 may be used to compute information about the room acoustics of the user's environment, which may also be stored by the process 1700 in the database. The room acoustics data can be used, for example, to create realistic reverberation models as discussed above in reference to FIGS. 4A and 4B.

At block 1760, the process 1700 optionally outputs HRTF data to a display (e.g., the display 1519 of FIG. 15A) and/or to a remote computer (e.g., via the interface 1518 of FIG. 15A).

At block 1770, the process 1700 optionally applies the HRTF from block 1740 to generate spatial audio for playback. The HRTF may be used for audio playback on the original listening device or may be used on another listening device to allow user playback of sounds that appear to come from arbitrary locations in space.

At block 1775, the process confirms whether recording data was stored at block 1730. It recording data is available, the process 1700 proceeds to block 1780. Otherwise, the process 1700 ends at block 1790. At block 1780, the process 1700 removes specific HRTF information from the recording, thereby creating a generic recording that maintains positional information. Binaural recordings typically have information specific to the geometry of the microphones. For measurements done on an individual, this can mean the HRTF is captured in the recording and is perfect or near perfect for the recording individual. At the same time, however, this means the recording will be encoded with an inaccurate HRTF for any other listener. To share experiences with another listener via either loudspeakers or headphones, the recording can be made generic. An example of one embodiment of the operations at block 1780 is described in more detail below in reference to FIG. 19.

Figure 18:
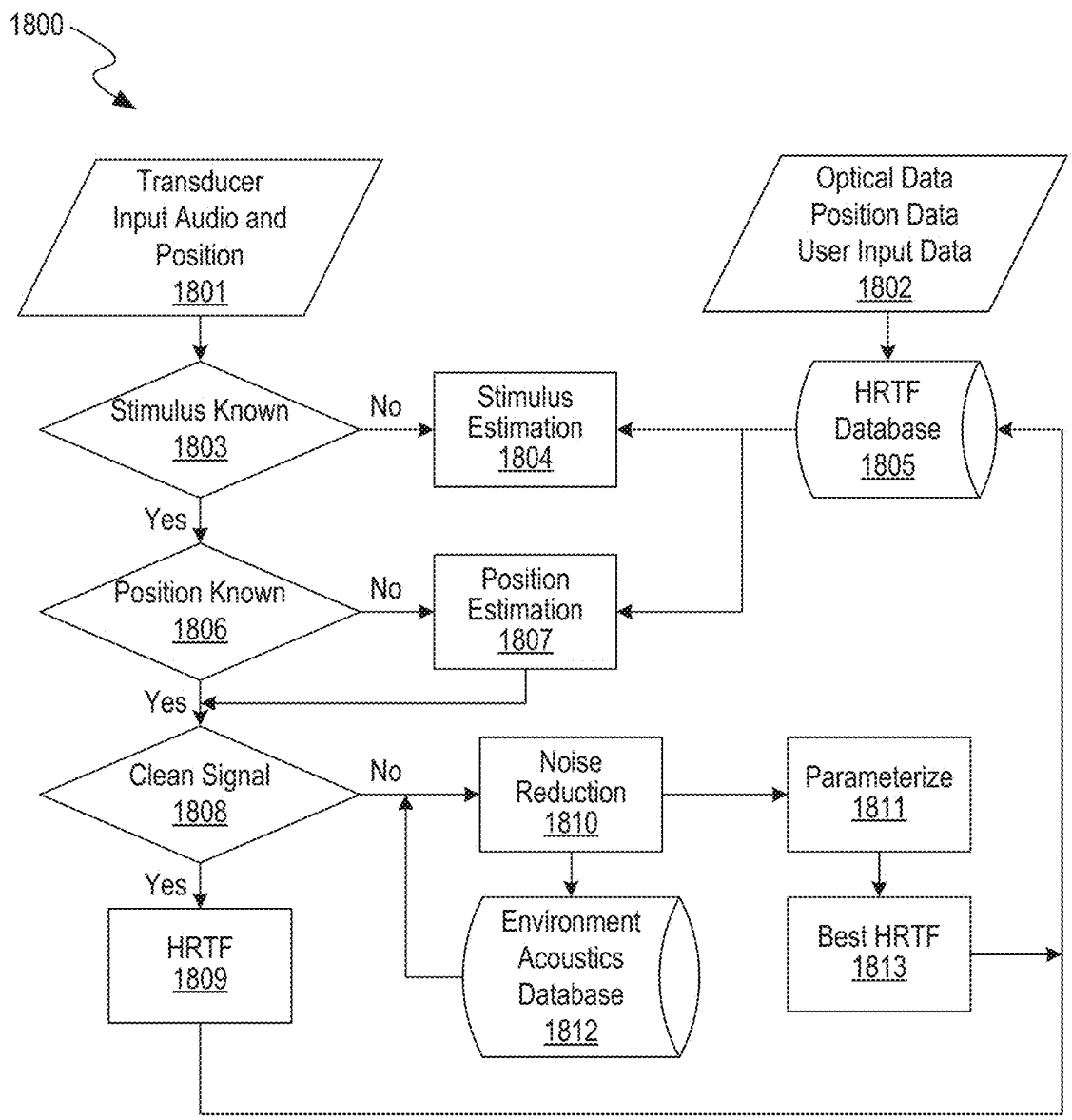
FIG. 18 is a flow diagram of an example process of computing a listener's Head Related Transfer Function.

FIG. 18 is a flow diagram of a process 1800 configured to determine a user's HRTF and create an environmental acoustics database. The process 1800 may include one or more instructions or operations stored in memory (e.g., the memory 1514 or the database 1517 of FIG. 15A) and executed by a processor in a computer (e.g., the processor 1515 in the computer 1510 of FIG. 15A). As those of ordinary skill in the art will appreciate, some embodiments of the disclosed technology include fewer or more steps and/or modules than shown in the illustrated embodiment of FIG. 18. Moreover, in some embodiments, the process 1800 operates in a different order of steps than those shown in the embodiment of FIG. 18.

At block 1801, the process 1800 receives an audio input signal from microphones (e.g., one or more and all position sensors).

At block 1802, the process feeds optical data including photographs (e.g., those received from the camera 1528 of FIG. 15A), position data (e.g., via the one or more sensors 1516 of FIG. 15A), and user input data (e.g., via the interface 1518 of FIG. 15A) into the HRTF database 1805. The HRTF database (e.g., the database 1517 of FIG. 15A) is used to assist in selecting a candidate HRTF(s) for reference analysis and overall range of expected parameters. In some embodiments, for example, a pinna and/or head recognition algorithm may be employed to match the user's pinna features in a photograph to one or more HRTFs associated with one or more of the user's pinna features. This data is used for statistical comparison with Stimulus Estimation, Position Estimation, and Parameterization of the overall HRTF. This database receives feedback grows and adapts over time.

At block 1803, the process determines if the audio signal received at block 1801 is "known," an active stimulus (e.g., the known sound 1527 of FIG. 15A) or "not known," a passive stimulus (e.g., one or more of the sound sources 1524*a-d* of FIG. 15A). If the stimulus is active, then the audio signal is processed through coherence and correlation methods. If the stimulus is passive, the process 1800 proceeds to block 1804 where process 1800 evaluates the signal in the frequency and/or time domain and designates signals and data that can be used as a virtual stimulus for analysis. This analysis may include data from multiple microphones, including a reference microphone (e.g., one or more of the microphones 1506 of FIGS. 15A-15I and 16), and comparison of data to expected HRTF signal behavior. A probability of useful stimulus data is included with the virtual stimulus data and used for further processing.

At block 1806, the process 1800 evaluates the position of the source (stimulus) relative to the receiver. If the position data is "known," then the stimulus is assigned the data. If the process 1800 is missing information about relative source and receiver position, then the process 1800 proceeds to block 1807, where an estimation of the position information is created from the signal and data present at block 1806 and by comparing to expected HRTF behavior from block 1805. That is, if the sound source location relative to the listener is unknown, the position of the sound source may still be estimated by comparing to characteristic HRTF behavior for different zones. For example, using gross estimations, the process 1800 can determine that the sound source is in one hemisphere when the signal at one ear is louder than the other ear, and further determine that the sound source is located in the lower quadrant if the characteristic shoulder bounce is missing. Further, successive acoustic measurements from the sound source may also show changes in the HRTF measurement, which allows the location of the sound source to be inferred and the HRTFs to be assigned a location. For example, if the time of arrival is equal for both ears, the source is in the median plane, and if another measurement shows the interaural time difference at a maximum, then the characteristic changes of the frequency response associated with these two points allow inference about the HRTF at points in-between due to known characteristic changes in global averages of HRTFs from the database. In addition, if the acoustic measurements match well to a set of acoustic measurements from the database, the database information may be used directly.

As the HRTF varies for positions r, θ, φ around the listener, assignment of the transfer function to a location is desired to assist in sound reproduction at arbitrary locations. In the "known" condition, position sensors may exist on the head and ears of the listener to track movement, on the torso to track relative head and torso position, and on the sound source to track location and motion relative to the listener. Methodologies for evaluating and assigning the HRTF locations include, but are not limited to: evaluation of early and late reflections to determine changes in location within the environment (e.g., motion); Doppler shifting of tonal sound as an indication of relative motion of sources and listener; beamforming between microphone array elements to determine sound source location relative to the listener and/or array; characteristic changes of the HRTF in frequency (concha bump, pinnae bumps and dips, shoulder bounces) as compared to the overall range of data collected for the individual and compared to general behaviors for HRTF per position; comparisons of sound time of arrival between the ears to the overall range of time arrivals (cross-correlation); comparison of what a head of a given size-rotating in a sound-field with characteristic and physically possible head movements to estimate head size and ear spacing and compare with known models. For example, the process can utilize successive acoustic measurements within a very short time period, and use the ITD from the latter measurement to determine that the second location is within a predetermined range of angles from the first location based on characteristic movements that a human head can make (e.g., as stored predetermined in a database), and use this information to determine the location of the sound source. The ITD also differs based on head sizes and, therefore, the process 1800 can associate the ITD with a particular range of characteristic movements. The position estimate and a probability of accuracy are assigned to this data for further analysis. Such analysis may include orientation, depth, Doppler shift, and general checks for stationarity and ergodicity.

At block 1808, the process 1800 evaluates the signal integrity for external noises and environmental acoustic properties, including echoes and other signal corruption in the original stimulus or introduced as a byproduct of processing. If the signal is clean, then the process 1800 proceeds to block 1809 and approves the HRTF. If the signal is not clean, the process 1800 proceeds to block 1810 and reduces the noise and removes environmental data. An assessment of signal integrity and confidence of parameters is performed and is passed with the signal for further analysis.

At block 1812, the process 1800 evaluates the environmental acoustic parameters (e.g., frequency spectra, overall sound power levels, reverberation time and/or other decay times, interaural cross-correlation) of the audio signal to improve the noise reduction block and to create a database of common environments for realistic playback in a simulated environment, including but not limited to virtual reality, augmented reality, and gaming.

At block 1811, the process 1800 evaluates the resulting data set, including probabilities, and parameterizes aspects of the HRTF to synthesize. Analysis and estimation techniques include, but are not limited to: time delay estimation, coherence and correlation, beamforming of arrays, sub-band frequency analysis, Bayesian statistics, neural network/machine learning, frequency analysis, time domain/phase analysis, comparison to existing data sets, and data fitting using least-squares and other methods.

At block 1813, the process 1800 selects a likely candidate HRTF that best fits with known and estimated data. The HRTF may be evaluated as a whole, or decomposed into head, torso, and ear (pinna) effects. The process 1800 may determine that parts of or the entire measured HRTF have sufficient data integrity and a high probability of correctly characterizing the listener; in that instance, the r, θ, φ HRTF is taken as-is. In some embodiments, the process 1800 determines that the HRTF has insufficient data integrity and or a high uncertainty in characterizing the listener. In these embodiments, some parameters may be sufficiently defined, including maximum time delay between ears, acoustic reflections from features on the pinnae to the microphone locations, etc. that are used to select the best HRTF set. The process 1800 combines elements of measured and parameterized HRTF. The process 1800 then stores the candidate HRTF in the database 1805.

In some embodiments, the process 1800 may include one or more additional steps such as, for example, using range of arrival times for Left and Right microphones to determine head size and select appropriate candidate HRTF(s). Alternatively or additionally, the process 1800 evaluates shoulder bounce in time and/or frequency domain to include in the HRTF and to resolve stimulus position. The process 1800 may evaluate bumps and dips in the high frequencies to resolve key features of the pinna and arrival angle. The process 1800 may also use reference microphone(s) for signal analysis reference and to resolve signal arrival location. In some embodiments, the process 1800 uses reference positional sensors or microphones on the head and torso to resolve relative rotation of the head and torso. Alternatively or additionally, the process 1800 beam forms across microphone elements and evaluation of time and frequency disturbances due microphone placement relative to key features of the pinnae. In some embodiments, elements of the HRTF that the process 1800 calculates may be used by the processes 400a and 400b discussed above respectively in reference to FIGS. 4A and 4B.

Figure 19:
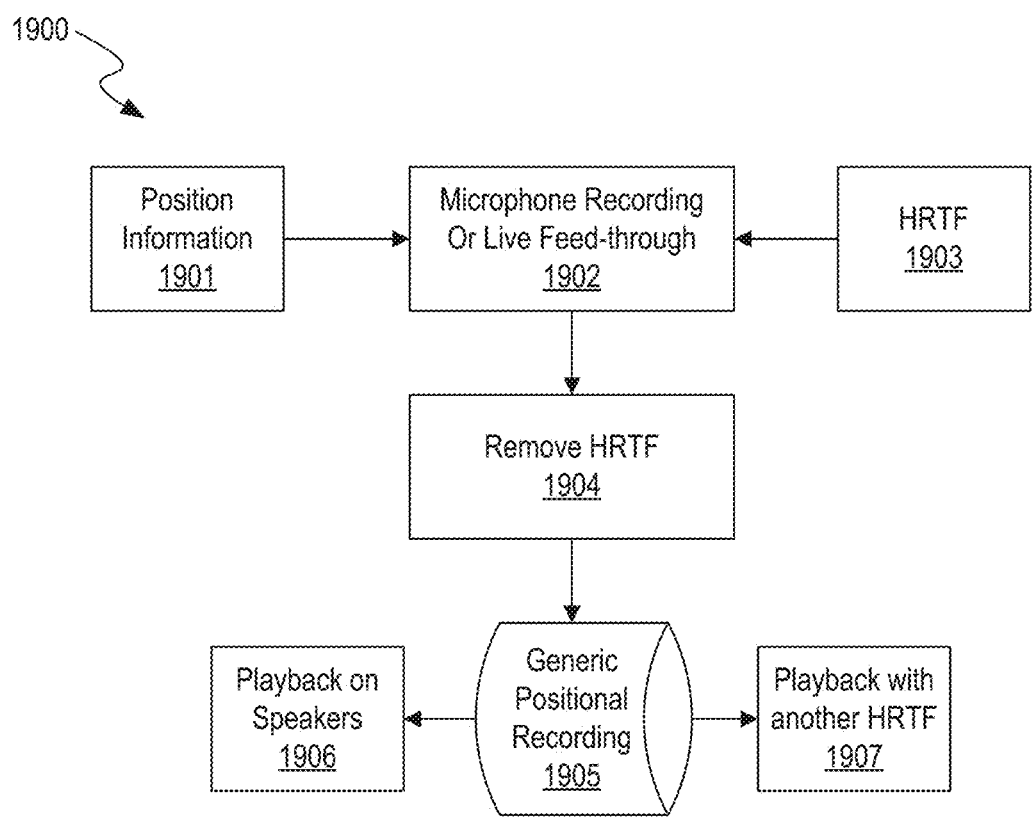
FIG. 19 is a flow diagram of a process of generating an output signal.

FIG. 19 is a flow diagram of a process 1900 configured to generically render a recording (e.g., the recording stored in block 1730 of audio signals captured in block 1710 of FIG. 17) and/or live playback.

At block 1901, the process 1900 collects the positional data. This data may be from positional sensors, or estimated from available information in the signal itself.

At block 1902, the process synchronizes the position information from block 1901 with the recording.

At block 1903, the process 1900 retrieves user HRTF information determined by previous processing, or determined using the process 1800 described above in reference to FIG. 18.

At block 1904, the process 1900 removes aspects of the HRTF that are specific to the recording individual. These aspects can include, for example, high-frequency pinnae effects, frequencies of body bounces, and time and level variations associated with head size.

At block 1905, the process generates the generic positional recording. In some embodiments, the process 1900 plays back the generic recording over loudspeakers (e.g., loudspeakers on a mobile device) using positional data to pan sound to the correct location. In other embodiments, the process 1900 at block 1907 applies another user's HRTF to the generic recording and scales these features to match the target HRTF.

Examples of embodiments of the disclosed technology are described below.

A virtual sound-field can be created using, for example, a sound source, such as an audio file(s) or live sound positioned at location x, y, z within an acoustic environment. The environment may be anechoic or have architectural acoustic characteristics (reverberation, reflections, decay characteristics, etc.) that are fixed, user selectable and/or audio content creator selectable. The environment may be captured from a real environment using impulse responses or other such characterizations or may be simulated using ray-trace or spectral architectural acoustic techniques. Additionally, microphones on the earphone may be used as inputs to capture the acoustic characteristics of the listener's environment for input into the model.

The listener can be located within the virtual sound-field to identify the relative location and orientation with respect to the listener's ears. This may be monitored in real time, for example, with the use of sensors either on the earphone or external that track motion and update which set of HRTFs are called at any given time.

Sound can be recreated for the listener as if they were actually within the virtual sound-field interacting with the sound-field through relative motion by constructing the HRTF(s) for the listener within the headphone. For example, partial HRTFs for different parts of the user's anatomy can be calculated.

A partial HRTF of the user's head can be calculated, for example, using a size of the user's head. The user's head size can be determined using sensors in the earphone that track the rotation of the head and calculate a radius. This may reference a database of real head sizes and pull up a set of real acoustic measurements, such as binaural impulse responses, of a head without ears or with featureless ears, or else a model may be created that simulates this. Another such method may be a 2D or 3D image that captures the listener's head and calculates size and or shape based on the image to reference an existing model or else creates one. Another method may be listening with microphones located on the earphone that characterize the ILD and ITD by comparing across the ears, and use this information to construct the head model. This method may include correction for placement of the microphones with respect to the ears.

A partial HRTF associated with a torso (and neck) can be created by using measurements of a real pinna-less head and torso in combination, by extracting information from a 2D or 3D image to select from an existing database or construct a model for the torso, by listening with a microphone(s) on the earphone to capture the in-situ torso effect (principally the body bounce), or by asking the user to input his/her shirt size or body measurements/estimates.

Depending on the type of earphone, the partial HRTF associated with the higher-frequency spectral components may be constructed in different ways.

For an earphone where the pinna is contained, such as a circumaural headphone, the combined partial HRTF from the above components may be played back through the transducers in the earphone. Interaction of this near-field transducer with the fine structure of the pinna will produce spectral HRTF components depending on location relative to the ear. For the traditional earphone, with a single transducer per ear located at or near on-axis with the ear canal, corrections for off-axis simulated HRTF angles may be included in signal processing. This correction may be minimal, with the pinna-less head and torso HRTFs played back without spectral correction, or it may have partial to full spectral correction by pulling from a database that contains the listener's HRTF an image may be used to create HRTF components associated with the pinna fine structure, or other methods.

Additionally, multiple transducers may be positioned within the earphone to ensonify the pinna from different HRTF angles. Steering the sound across the transducers may be used to smoothly transition between transducer regions. Additionally, for sparse transducer locations within the ear cup, spectral HRTF data from alternate sources such as images or known user databases may be used to fill in these less populated zones. For example, if there is not a transducer below the pinna, a tracking notch filter may be used to simulate sound moving through that region from an on-axis transducer, while an upper transducer may be used to directly ensonify the ear for HRTFs from elevated angles. In the case of sparse transducer locations, or the case of a single transducer per ear cup, neutralization of the spectral cues associated with transducer placement for HRTF angles not corresponding to the placement, a neutralizing HRTF correction may be applied prior to adding in the correct spectral cues. For example, if a transducer is located at 90 degrees to the ear, it will likely have a characteristic concha bump associated with that angle. To make the sound appear to come from another angle, the system can remove the natural frequency response before the desired HRTF is applied to a signal emitted by the transducer.

To reduce spectral effects associated with the design and construction of the earphone, such as interference from standing waves, the interior of the ear cup may be made anechoic by using, for example, absorptive materials and small transducers.

For earphones that do not contain the pinna, such as insert-earphones or concha-phones, the HRTF fine structure associated with the pinna may be constructed by using microphones to learn portions of the HRTF as described, for example, in FIG. 18. For a sound source (real sound in environment) with a high probability of being positioned in front of the listener, the spectral components of the frequency response may be extracted for 6-10 kHz, and combined with spectral components from 10-20 kHz from another sound source with more energy in this frequency band. Additionally, this may be supplemented with 2D or 3D image-based information that is used to pull spectral components from a database or create from a model.

For any earphone type, the transducers are in the near-field to the listener. Creation of the virtual sound-field may typically involve simulating sounds at various depths from the listener. Range correction is added into the HRTF by accounting for basic acoustic propagation such as roll-off in loudness levels associated with distance and adjustment of the direct to reflected sound ratio of room/environmental acoustics (reverberation). That is, a sound near the head will present with a stronger direct to reflected sound ratio, while a sound far from the head may have equal direct to reflected sound, or even stronger reflected sound. The environmental acoustics may use 3D impulse responses from real sound environments or simulated 3D impulse responses with different HRTFs applied to the direct and indirect (reflected) sound, which may typically arrive from different angles. The resulting acoustic response for the listener can recreate what would have been heard in a real sound environment.

Figure 21B:
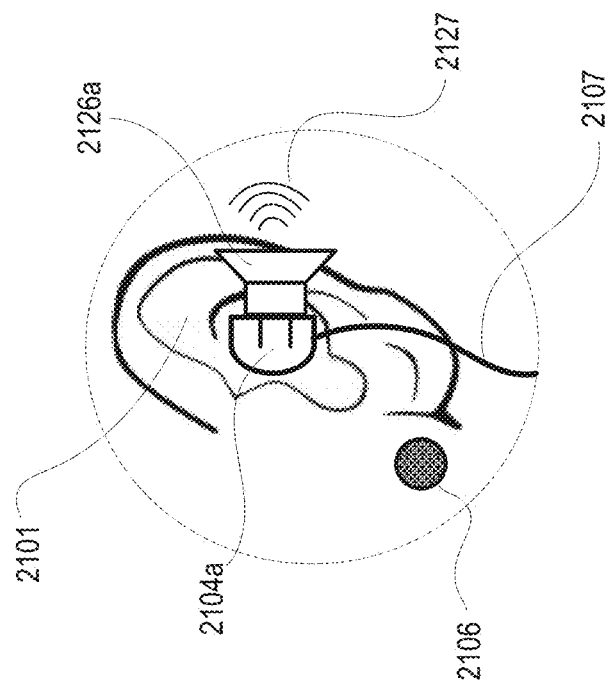
FIG. 21B is an enlarged view of a portion of FIG. 21A.
Figure 21A:
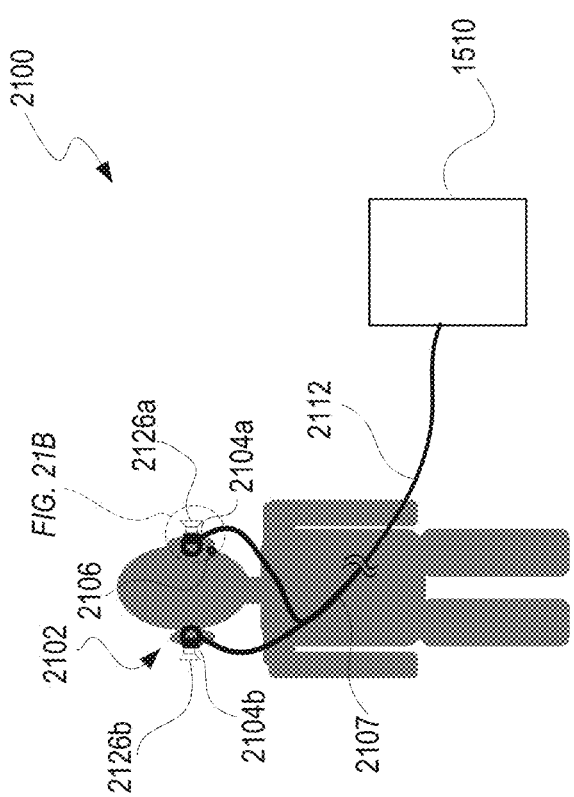
FIG. 21A is a schematic view of a measurement system configured in accordance with an embodiment of the disclosed technology.

FIG. 21A is a schematic view of a measurement system 2100 configured in accordance with an embodiment of the disclosed technology. FIG. 21B is an enlarged view of a portion of FIG. 21A. Referring to FIGS. 21A and 21B together, the system 2100 includes a listening device 2102 (e.g., a headphone, in-ear earphone, over-ear earphone, speaker, and/or another suitable sound source) communicatively coupled to the computer 1510 (FIG. 15A) via a cord 2107 and a communication link 2112 (e.g., a cable, a wireless connection). The device 2102 includes a first (e.g., left) earphone 2104a and a second (e.g., right) earphone 2104b. A first transducer 2126a is attached to the first earphone 2104a and a second transducer 2126b is attached to the second earphone 2104b. The first and second transducers 2126a and 2126b are configured to emit a sound 2127. In some embodiments, the sound 2127 is a known sound (e.g., a standard test signal and/or sweep signal). In other embodiments, the sound 2127 includes another suitable sound or sounds (e.g., a song, vocal tracks, sound tracks). The transducers may be dedicated for measurement, or may be used as the primary listening device in the earphone, with an acoustic path(s) to the microphones.

A microphone 2106 is configured to acquire data based on the sound 2127 emitted by the first transducer 2126a and/or the second transducer 2126b. As explained in more detail below with reference to FIG. 25, the acquired data can be analyzed by the computer 1510 to detect features and/or properties of the pinna of the user's ear 2101 for use in determining the user's HRTF. In the illustrated embodiment, the microphone 2106 is positioned adjacent to the first earphone 2104a in front of a user's ear 2101 (FIG. 21B). A single microphone in front of the ear may be sufficient to characterize frontal pinna spectral cues, such as frequency of dip and bump features. In other embodiments, however, the microphone 2106 is positioned at another suitable location with respect to the user's ear 2101. FIGS. 22A-22F, for example, show embodiments of other suitable positions of the microphone 2106 with respect to the user's ear. Furthermore, in some embodiments, the system 2100 includes two or more microphones 2106. A system having more than one microphone may extrapolate the side and rear HRTFs or may be used for the frontal zone alone. For example, data from one microphone in front of the ear and another above the ear (FIG. 22G) may be used to characterize frontal, side, and top HRTFs, or any other angles. FIGS. 22H-22L show embodiments of suitable arrangements of a plurality of microphones 2106. In further embodiments, however, the microphone(s) 2106 can be placed in other suitable positions and/or arrangements.

With reference to FIG. 22H, one microphone is located in the front of an ear (e.g., closer to a listener's face) and another microphone is located proximate to an ear canal in the pinna of an ear. The two microphones share at least one axis (e.g., located on the same orthogonal vector). In some embodiments, the positions of microphones in this arrangement can be useful for determining how sound is received from the front of a listener's environment. Also, in some embodiments, the microphones behave as redundant microphones such that received sounds at each microphone can be compared to reduce or eliminate noise caused by a common source. For example, if a noise sound or frequency is received by both microphones, the listening device or a mobile device can determine that the noise is pollution (e.g., a particular frequency sound generated in the background) and eliminate it from the signal processing. In some implementations, the system can have two earphones with the microphone arrangement shown in FIG. 22, and based on comparing the sounds received at each earphone, it can eliminate or reduce noise pollution (e.g., reduce a particular frequency sound generated in the background).

With continuing reference to FIG. 22H, if an acoustic stimulus generator (e.g., a smart phone emitting sound) has a compromised signal (e.g., hand or phone case blocking part of the phone speaker, phone speaker otherwise not behaving properly) the additional microphone acts a reference to remove measurement differences due to the stimulus and measurement differences due to the HRTF. The additional microphone in the orientation shown in FIG. 22H can also be used to disambiguate signals from the front of the listener. For example, the arrangement of two microphones shown in FIG. 22H can address a scenario for spatial hearing and HRTF reconstruction where sound is received from directly in front of the user.

In FIG. 22M, microphones are arranged in a beamforming array to capture sound in an environment for 3D sound. In some embodiments, for example, the microphone arrangement show in FIG. 22M can capture a 3D environment and mix this into the earphone for immediate playback with HRTF processing or for 3D audio recording using the process in FIG. 19 to produce 3D sound.

In the illustrated embodiment, the microphone 2106 is wirelessly coupled to the computer 1510 (e.g., via a wireless radio link). In other embodiments, however, a wire or cable communicatively couples the microphone 2106 to the computer 1510 (e.g., via the link 2112). In some embodiments, the microphone 2106 can be attached to the first earphone 2104a and/or the cord 2107, similar to microphone 1506, as described above with reference to FIG. 15G. In other embodiments, however, the microphone 2106 can be positioned on a device carried and/or worn by the user. As described in more detail below with reference to FIGS. 23A-24, the microphone 2106 can be attached and/or otherwise positioned on, for example, a head-mounted display, a mobile device (e.g., a smartphone), and/or another suitable device. In certain embodiments, the microphone 2106 is positioned on a structure (e.g., a boom, a stand, a tripod) spaced apart from the user.

FIGS. 23A-C are schematic views of corresponding head-mounted devices 2301a-c. Referring to FIGS. 23A-C together, the device 2301a (FIG. 23A) includes a head-mounted display 2302 configured to present visual information (e.g., 2D and/or 3D images, movies, and/or combinations thereof) to a user. The device 2301a includes a transducer 2326 configured to emit a known sound (e.g., the known sound 2127 of FIG. 21B). The microphones 2106 can capture sound data that includes, for example, the known sound and echoes and reflections thereof. The captured sound data can be used to detect features of the user's ear (not shown). In some embodiments, the microphones 2106 are carried by a listening device (e.g., the device 2102 of FIG. 21A). In other embodiments, the microphones 2106 can be carried by the device 2301a (FIG. 23A). In certain embodiments, as shown in FIG. 23B, the microphones 2106 can acquire sound data emitted by speakers 2326 of a smartphone 2328 that is attached to the head-mounted device 2301b. In other embodiments, however, one or more of the microphones 2106 can be attached to the head-mounted device 2301c (FIG. 23C) and configured to acquire sound data from one or more of the transducers 2326 attached to the device 2301c and/or a separate listening device worn by the user (e.g., the device 2102 of FIG. 21A).

FIG. 24 is a schematic view of earphones 2402 configured in accordance with another embodiment of the disclosed technology. The earphones 2402 include a pair of speakers 2403 configured to output sound into a user's ear canal. Each of a pair of supports 2405 is configured to be at least partially worn on one of the wearer's ears and includes one of the microphones 2106. In the illustrated embodiment, the transducers 2126 are positioned opposite corresponding speakers 2403 such that when the user wears the earphones 2402, the transducers 2126 face generally outward from the user's ear (as shown, e.g., in FIG. 21B).

Figure 25:
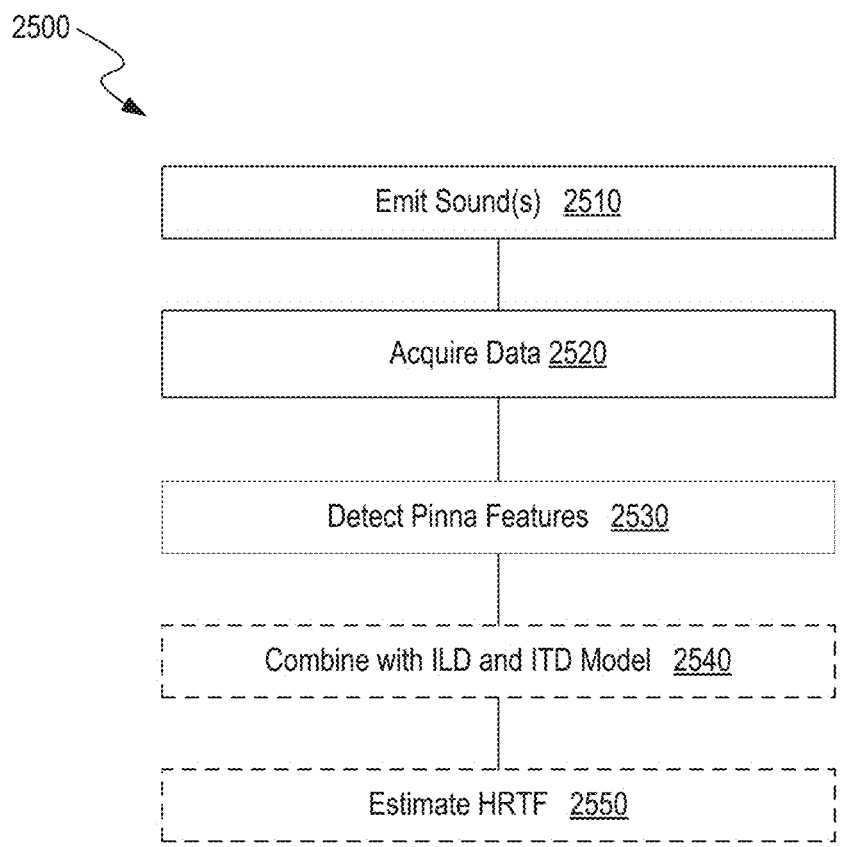
FIG. 25 is a flow diagram of an example process of determining a portion of a user's Head Related Transfer Function.

FIG. 25 is a flow diagram of an example process 2500 of determining a portion of a user's HRTF. The process 2500 may include one or more instructions or operations stored on memory (e.g., the memory 1514 or the database 1517 of FIG. 15A) and executed by a processor in a computer (e.g., the processor 1515 in the computer 1510 of FIG. 15A). The process 2500 may be used to detect features (e.g., shapes, ridges, sizes) of one or both of the user's pinnae. The pinnae features can be combined with other measurements to at least partially determine a user's HRTF.

At block 2510, the process 2500 emits one or more sound signals via one or more transducers positioned adjacent to one or both of the user's pinnae. The sound signals can include, for example, standard test signals such as a Maximum Length Sequence, a sine sweep and/or another suitable sound signal. In some embodiments, the process 2500 transmits sound signals from one or more transducers attached to earphones worn by the user (e.g., the device 2102 of FIGS. 21A and 21B and/or the device 2402 of FIG. 24). In other embodiments, the process 2500 transmits sound signals from a head-mounted device worn on the user's head (e.g., the devices 2301a and/or 2301b of FIGS. 23A and 23B). In certain embodiments, the process 2500 transmits sound signals from one or more transducers positioned proximate to the user (e.g., the transducer 1526 of FIG. 15A). In one embodiment, the process 2500 transmits sound signals from a mobile device (e.g., the mobile device 2328 of FIG. 23B) positioned near the user's head and/or on a head-mounted device (e.g., the device 2301b) worn on the user's head. In further embodiments, the process 2500 transmits sound from one or more other suitable transducers in the near-field of the user (e.g., approximately 1.2 meters or less from the user's pinnae).

At block 2520, the process 2500 acquires data based on the sound signals emitted at block 2510. The process 2500, for example, can acquire sound data corresponding to a direct sound signal and/or reflections thereof emitted from the transducer at one or more microphones positioned on or near the user's head. In some embodiments, the process 2500 receives sound from one or more microphones positioned on and/or near the user's ear as discussed above with reference to FIGS. 21A, 21B, 22A-L, 23A-C, and 24.

At block 2530, the process 2500 uses the emitted sound signals and the acquired sound data to detect features and/or properties of at least one of the user's pinnae. The process 2500 computes and/or estimates, for example, path length differences between the emitted sound signals and the acquired data to detect sizes and/or shapes of one or more pinna structures (e.g., the concha, the helix, the tragus, the antihelix, the cavum conchae). The path length difference from direct sound arrival to the microphones and sound reflecting/interacting with the pinna structures prior to arriving at the microphones can cause distinct time and spectral cues associated with constructive and destructive interference. The frequency and magnitude of these time and spectral cues are related to spectral cues in the full-head HRTF. The process 2500 can use this information to detect pinna features and/or predict the HRTF-associated sound sources in front of the transducer.

For example, one pinna feature may be related to the ear's concha structure. As a sound source moves to another perspective with respect to the concha, the process 2500 can estimate corresponding shifts in HRTF spectral features. Additional microphones may be used at other angles around the ear and information from these perspectives used to improve the HRTF prediction for those angles and at predicted angles. Due to the principle of acoustic reciprocity, any of the microphone and speaker locations may be reversed so that the process 2500 processes the resulting information in the same manner. Large spectral shifts in the HRTF frequency response can vary among listeners and can cause errors in sound localization, for example, when one listener listens to audio playback using another listener's HRTF. This phenomenon is known as "front/back confusion." One or more of the pinna structures described above can have many physical features that interact with forward-incident sounds and reflect into the ear canal. Accordingly, accurate detection of pinna features can significantly improve an estimate of the user's HRTF and enhance 3D perception of sound having the estimated HRTF applied thereto.

At block 2540, the process 2500 can optionally combine the detected pinna features with the ILD and ITD measurements based on the user's head (e.g., head size). As discussed above with reference to FIGS. 4A and 4B, the measurements of head size can include, for example, cameras or leads located on the headphone or earphone structure and other sensors including but not limited to optical, acoustical, or mechanical sensors (flex, tension, stretch, etc.), accelerometers, magnetometers, gyroscopes, presence of glasses, head bands/head-straps, head-mounted displays, helmets, phones, etc. The microphones around the ear may be used to measure the ITD and match to a model, or may be used to capture multi-path around the head for greater multidimensional head size resolution. In some embodiments, for example, the transmitted calibration sound can be moved around the listener's head (e.g., travels across a nose, travels over the top a head, and/or travels around a listener's back). At certain angles of the sound path, such as between 120° and 75° in the azimuth, the sound may have similar arrival times for the ear spaced further from the sound source. Using this information and comparing two different types of head size measurement, the process 2500 can disambiguate length, width, and depth of the head to enhance accuracy.

At block 2550, the process 2500 optionally uses the detected pinna features and ILD and ITD information to estimate the user's HRTF as discussed above, for example, with reference to FIGS. 4A and 4B.

Figure 26A:
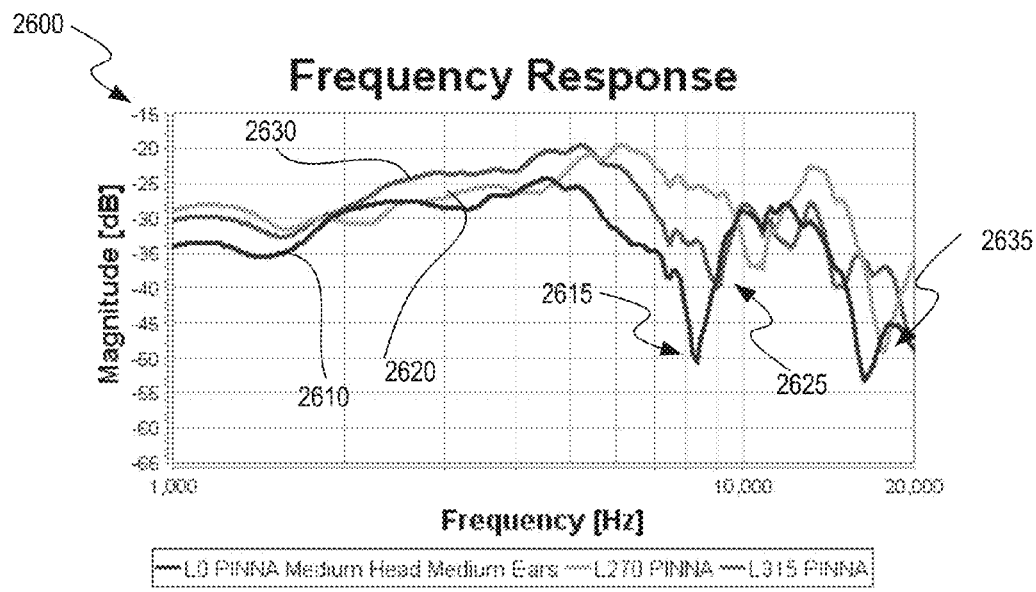
FIGS. 26A and 26B are graphs of frequency responses.
Figure 26B:
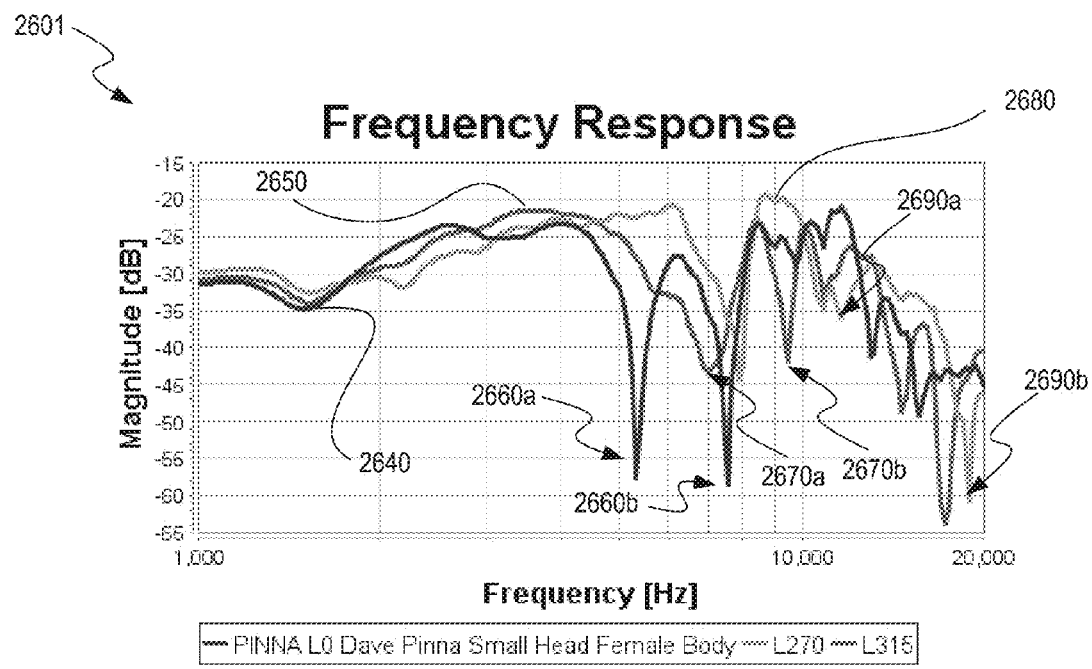

FIGS. 26A and 26B include graphs 2600 and 2601, showing frequency responses for three different transducer and microphone orientations, respectively. The graph 2600 (FIG. 26A) includes frequency responses 2610, 2620, and 2630 corresponding to microphone orientations at 0 degrees, 90 degrees (or 270 degrees), and 45 degrees (or 315 degrees), respectively, relative to an ear of a first listener. The graph 2601 (FIG. 26B) includes responses 2640, 2650, and 2680 corresponding to microphone orientations at, for example, 0 degrees (i.e., on axis with one of the ears), 90 degrees (or 270 degrees), and 45 degrees (or 315 degrees), respectively, relative to an ear of a listener. The responses 2610-2660 may correspond to microphone data acquired, for example, by the process 2500 (FIG. 25) at block 2520. In some embodiments, the responses 2610-2660 can be acquired using microphones positioned at the 0-, 90-, and 45-degree orientations and/or one or other orientations that acquire sound data from a stationary transducer (e.g., the transducer 2127 of FIGS. 21A and 21B). In other embodiments, however, the responses 2610-2660 can be acquired using a stationary microphone and one or more transducers at one or more orientations relative to the user's ear as discussed above, for example, with reference to FIGS. 15A-G.

Referring to FIG. 26A, the response 2610 has a dip feature 2615 at approximately 8 kHz. The response 2620 has a dip feature 2625 at approximately 9 kHz. The response 2630 has a dip feature between about 15 kHz and 20 kHz, or approximately 18 kHz. Referring to FIG. 26B, the response 2640 has dip features 2660*a* and 2660*b* at approximately 5.2 kHz and 7.5 kHz, respectively. The response 2650 has dip features 2670*a* and 2670*b* at approximately 7 kHz and 9.5 kHz, respectively. The response 2680 has dip features 2690*a* and 2690*b* at approximately 12 kHz and 19 kHz, respectively.

Referring to FIGS. 25, 26A and 26B together, for a given ear, the frequency and magnitude of the individual dip features and/or frequency differences between dip features of different responses can correspond to physical features and characteristics of a user's ear. In some embodiments, for example, the process 2500 (FIG. 25) can use the frequency responses acquired at block 2520 to determine physical characteristics of the user's pinna. In one embodiment, for example, the process 2500 matches a measured frequency response to one or more similar frequency responses corresponding to known pinna shapes stored in a database (e.g., the database 1517 of FIG. 15A). In other embodiments, however, the process 2500 can use a neural network and/or a machine learning algorithm (e.g., stored in the memory 1514 of FIG. 15A) to match an acquired frequency response to a corresponding pinna shape. The process 2500 can use the matched pinna shape(s) to determine and/or estimate the HRTF of the pinna, as discussed above with reference to FIGS. 4A, 4B and 25.

EXAMPLES

Several aspects of the present technology are set forth in the following examples.

1. A method of calibrating sound for a listener, the method comprising:
   determining a distance between a first ear and second ear for a listener;
   determining a first Head Related Transfer Function (HRTF) for the first ear using a first transducer physically coupled to a first earphone located proximate to the first ear;
   modifying the first HRTF based on the distance between the first ear and the second ear;
   determining a second HRTF for the second ear using a second transducer physically coupled to a second earphone located proximate to the second ear;
   modifying the second HRTF based on the distance between the first ear and the second ear;
   generating a composite HRTF based on the modified first and second HRTFs; and
   applying the composite HRTF to audio signals to be transmitted to the listener.

2. The method of example 1 wherein determining the distance between the first ear and the second ear further includes at least one of the following:
   receiving imaging data of the listener and using the received imaging data to implement an image recognition algorithm that determines the distance;
   determining an amount of time it takes an emitted sound to travel from the first transducer to the second earphone or from the second transducer to the first earphone, wherein the first earphone and second earphone include at least one microphone to receive the emitted sound;
   determining a displacement distance from a position of a headband physically coupled to the first and second earphones;
   receiving accelerometer data related to head rotation or head movement of the listener, wherein an accelerometer is physically coupled to the first or second earphone; or
   receiving an input of the distance from the listener via a graphical user interface.

3. The method of example 1 or 2 wherein determining the first HRTF for the first ear further includes:
   emitting a sound from the first transducer;
   collecting reflection data for the emitted sound at a microphone positioned proximate to the first transducer and the first earphone; and
   determining one or more of pinna characteristics of the first ear by comparing the collected reflection data to a database that includes reflection data and corresponding pinna characteristics.

4. The method of any one of examples 1-3 wherein determining the first HRTF for the first ear further includes:
   identifying coordinates for sound emitted from the first transducer relative to a position of the first ear based at least partially on receiving a predetermined audio signal at a microphone positioned adjacent to the first transducer and the first earphone.

5. The method of any one of examples 1-4 wherein the method is performed in a non-anechoic environment.

6. The method of any one of examples 1-5, further comprising:
   adjusting the composite HRTF based on receiving indication that the listener is moving or moved; or
   adjusting the composite HRTF based on receiving motion data for the first or second earphone.

7. A non-transitory computer-readable medium storing instructions that when executed by a processor cause a device to perform operations to calibrate sound for a listener, the operations comprising:
   transmitting a calibration audio signal with a transducer, wherein the calibration audio signal has a known source location and known frequency;
   determining a transfer function for an ear of the listener receiving the calibration audio signal at least partially based on a microphone receiving the calibration audio signal, wherein the microphone is physically coupled to an earphone located proximate to the ear;
   receiving data for head size and shape of the listener;
   modifying the transfer function based on the received head size and shape; and
   applying the modified transfer function to audio signals transmitted to the listener.

8. The non-transitory computer-readable medium of example 7 wherein the calibration audio signal is a first calibration audio signal, wherein the transducer is a first transducer, wherein the transfer function is a first transfer function, wherein the ear is a first ear, wherein the earphone is a first earphone, and the operations further comprise:

transmitting a second calibration audio signal with a second transducer, wherein the second calibration audio signal has a known source location and known frequency;
determining a second transfer function for a second ear of the listener at least partially based on the microphone receiving the second audio calibration signal,
wherein the second transducer is physically coupled to a second earphone located proximate to the second ear;
modifying the first and second transfer functions based on the data for the head size and shape of the listener; and
applying the first and second transfer functions to audio signals transmitted to the listener.

9. The non-transitory computer-readable medium of example 7 or 8 wherein the calibration audio signal further includes at least one of the following:
an audio signal in standard 5.1 or 7.1 channel formats; or
an audio signal that is transmitted from a mobile device, wherein the mobile device has a known location at least partially based on an accelerometer physically coupled to the mobile device, and
wherein the calibration audio signal has a known frequency and amplitude.

10. The non-transitory computer-readable medium of any one of examples 7-9 wherein determining the transfer function for the ear receiving the calibration audio signal further comprises:
determining one or more of the pinna characteristics of the ear by comparing sound reflection data to a database that includes reflection data and corresponding pinna characteristics.

11. The non-transitory computer-readable medium of any one of examples 7-10 wherein receiving data for the listener head size and shape further comprises:
determining a distance between two ears at least partially based on receiving imaging data of the listener;
determining an amount of time it takes an emitted sound to travel through or around the listener's head; or
receiving an input of the distance from the listener via a graphical user interface.

12. The non-transitory computer-readable medium of any one of examples 7-11 wherein the method is performed in a non-anechoic environment.

13. A method for calibrating sound, the method comprising:
transmitting, via a server, instructions to a mobile device to install a mobile application for calibrating a listening device worn at least proximate to ears of a listener,
wherein the mobile application is configured to cause the mobile device to emit predetermined audio signals for calibrating the ear phones, and
wherein the mobile application communicatively couples the listening device to the server;
receiving, from the mobile device, listener anatomy data, wherein the anatomy data includes a listener head size or head shape;
determining, via the server, a transfer function for at least one ear for the listener partially based on the received listener anatomy data; and
sending instructions to the listening device to modify sound transmitted to the listener at least partially based on the determined transfer function.

14. The method of example 13 wherein determining the transfer function further includes:
acquiring reflection data related to an emitted audio signal from a microphone physically coupled to the listening device; and
determining one or more pinna characteristics of the at least one ear by comparing the acquired reflection data to a database that includes reflection data and corresponding pinna characteristics.

15. The method of example 13 or 14 wherein receiving listener anatomy data further includes at least one of the following:
determining a distance between ears for the listener at least partially based on receiving imaging data of the listener; or
determining an amount of time it takes an emitted sound to travel between the ears.

16. The method of any one of examples 13-15, further comprising:
identifying coordinates for sound emitted from a transducer relative to a position of the listener based at least partially on receiving a predetermined audio signal at a microphone positioned adjacent to the transducer,
wherein the transducer is physically coupled to the listening device worn by the listener.

17. The method of anyone of examples 13-16 wherein the listening device includes one of the following:
a pair of over-ear headphones;
a pair of on-ear headphones; or
in-ear earphones.

18. The method of any one of claims 13-17 wherein modifying sound transmitted to the listener further comprises:
emitting sounds from four transducers arranged in front, above, behind, and on axis with the at least one ear of the listener.

19. The method of any one of examples 13-18 wherein the method is performed while the listener is participating in a virtual reality or augmented reality scenario, and wherein the method further comprises:
before a sound is emitted from the listening device, determining a location of a sound source emitting the sound relative to the user;
selecting one transducer from multiple transducers physically coupled to the listening device at least partially based on the determined sound source location; and
emitting a modified sound from the selected transducer, wherein the modified sound is at least partially based on the sound and the determined transfer function.

20. The method of any one of examples 13-19 wherein the audio signals for calibrating further include at least one of the following:
a maximum length sequence;
a sine sweep; or
any combination thereof.

21. Earphones to be worn on a head of a user, the earphones comprising:
two ear cups;
multiple speakers in each of the ear cups;
at least one microphone positioned inside at least one of the ear cups, wherein the microphone produces audio data to calibrate the headphones for the user; and
a processor coupled to the speakers and to the microphone,
wherein the processor is configured to apply a transfer function to audio signals transmitted to the user via the speakers, and wherein the transfer function is based in part on the audio data from the microphone to account for characteristics of ears of the user.

CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of calibrating sound for a listener, the method comprising:
    determining a distance between a first ear and second ear for a listener;
    determining a first Head Related Transfer Function (HRTF) for the first ear using a first transducer physically coupled to a first earphone located proximate to the first ear;
    modifying the first HRTF based on the distance between the first ear and the second ear;
    determining a second HRTF for the second ear using a second transducer physically coupled to a second earphone located proximate to the second ear;
    modifying the second HRTF based on the distance between the first ear and the second ear;
    generating a composite HRTF based on the modified first and second HRTFs; and
    applying the composite HRTF to audio signals to be transmitted to the listener.

2. The method of claim 1 wherein determining the distance between the first ear and the second ear further includes at least one of the following:
    receiving imaging data of the listener and using the received imaging data to implement an image recognition algorithm that determines the distance;
    determining an amount of time it takes an emitted sound to travel from the first transducer to the second earphone or from the second transducer to the first earphone, wherein the first earphone and second earphone include at least one microphone to receive the emitted sound;
    determining a displacement distance from a position of a headband physically coupled to the first and second earphones;
    receiving accelerometer data related to head rotation or head movement of the listener, wherein an accelerometer is physically coupled to the first or second earphone; or
    receiving an input of the distance from the listener via a graphical user interface.

3. The method of claim 1 wherein determining the first HRTF for the first ear further includes:
    emitting a sound from the first transducer;
    collecting reflection data for the emitted sound at a microphone positioned proximate to the first transducer and the first earphone; and
    determining one or more of pinna characteristics of the first ear by comparing the collected reflection data to a database that includes reflection data and corresponding pinna characteristics.

4. The method of claim 1 wherein determining the first HRTF for the first ear further includes:
    identifying coordinates for sound emitted from the first transducer relative to a position of the first ear based at least partially on receiving a predetermined audio signal at a microphone positioned adjacent to the first transducer and the first earphone.

5. The method of claim 1 wherein the method is performed in a non-anechoic environment.

6. The method of claim 1, further comprising:
    adjusting the composite HRTF based on receiving indication that the listener is moving or moved; or
    adjusting the composite HRTF based on receiving motion data for the first or second earphone.

7. A non-transitory computer-readable medium storing instructions that when executed by a processor cause a device to perform operations to calibrate sound for a listener, the operations comprising:
    transmitting a calibration audio signal with a transducer, wherein the calibration audio signal has a known source location and known frequency;
    determining a transfer function for an ear of the listener receiving the calibration audio signal at least partially based on a microphone receiving the calibration audio signal, wherein the microphone is physically coupled to an earphone located proximate to the ear;
    receiving data for head size and shape of the listener;
    modifying the transfer function based on the received head size and shape; and
    applying the modified transfer function to audio signals transmitted to the listener.

8. The non-transitory computer-readable medium of claim 7 wherein the calibration audio signal is a first calibration audio signal, wherein the transducer is a first transducer, wherein the transfer function is a first transfer function, wherein the ear is a first ear, wherein the earphone is a first earphone, and the operations further comprise:
transmitting a second calibration audio signal with a second transducer, wherein the second calibration audio signal has a known source location and known frequency;
determining a second transfer function for a second ear of the listener at least partially based on the microphone receiving the second audio calibration signal,
wherein the second transducer is physically coupled to a second earphone located proximate to the second ear;
modifying the first and second transfer functions based on the data for the head size and shape of the listener; and
applying the first and second transfer functions to audio signals transmitted to the listener.

9. The non-transitory computer-readable medium of claim 7 wherein the calibration audio signal further includes at least one of the following:
an audio signal in standard 5.1 or 7.1 channel formats; or
an audio signal that is transmitted from a mobile device,
wherein the mobile device has a known location at least partially based on an accelerometer physically coupled to the mobile device, and
wherein the calibration audio signal has a known frequency and amplitude.

10. The non-transitory computer-readable medium of claim 7 wherein determining the transfer function for the ear receiving the calibration audio signal further comprises:
determining one or more of the pinna characteristics of the ear by comparing sound reflection data to a database that includes reflection data and corresponding pinna characteristics.

11. The non-transitory computer-readable medium of claim 7 wherein receiving data for the listener head size and shape further comprises:
determining a distance between two ears at least partially based on receiving imaging data of the listener;
determining an amount of time it takes an emitted sound to travel through or around the listener's head; or
receiving an input of the distance from the listener via a graphical user interface.

12. The non-transitory computer-readable medium of claim 7 wherein the method is performed in a non-anechoic environment.

13. A method for calibrating sound, the method comprising:
transmitting, via a server, instructions to a mobile device to install a mobile application for calibrating a listening device worn at least proximate to ears of a listener,
wherein the mobile application is configured to cause the mobile device to emit predetermined audio signals for calibrating the ear phones, and
wherein the mobile application communicatively couples the listening device to the server;
receiving, from the mobile device, listener anatomy data, wherein the anatomy data includes a listener head size or head shape;
determining, via the server, a transfer function for at least one ear for the listener partially based on the received listener anatomy data; and
sending instructions to the listening device to modify sound transmitted to the listener at least partially based on the determined transfer function.

14. The method of claim 13 wherein determining the transfer function further includes:
acquiring reflection data related to an emitted audio signal from a microphone physically coupled to the listening device; and
determining one or more pinna characteristics of the at least one ear by comparing the acquired reflection data to a database that includes reflection data and corresponding pinna characteristics.

15. The method of claim 13 wherein receiving listener anatomy data further includes at least one of the following:
determining a distance between ears for the listener at least partially based on receiving imaging data of the listener; or
determining an amount of time it takes an emitted sound to travel between the ears.

16. The method of claim 13, further comprising:
identifying coordinates for sound emitted from a transducer relative to a position of the listener based at least partially on receiving a predetermined audio signal at a microphone positioned adjacent to the transducer,
wherein the transducer is physically coupled to the listening device worn by the listener.

17. The method of claim 13 wherein the listening device includes one of the following:
a pair of over-ear headphones;
a pair of on-ear headphones; or
in-ear earphones.

18. The method of claim 13 wherein modifying sound transmitted to the listener further comprises:
emitting sounds from four transducers arranged in front, above, behind, and on axis with the at least one ear of the listener.

19. The method of claim 13 wherein the method is performed while the listener is participating in a virtual reality or augmented reality scenario, and wherein the method further comprises:
before a sound is emitted from the listening device, determining a location of a sound source emitting the sound relative to the user;
selecting one transducer from multiple transducers physically coupled to the listening device at least partially based on the determined sound source location; and
emitting a modified sound from the selected transducer, wherein the modified sound is at least partially based on the sound and the determined transfer function.

20. The method of claim 13 wherein the audio signals for calibrating further include at least one of the following:
a maximum length sequence;
a sine sweep; or
any combination thereof.

21. Earphones to be worn on a head of a user, the earphones comprising:
two ear cups;
multiple speakers in each of the ear cups;
at least one microphone positioned inside at least one of the ear cups, wherein the microphone produces audio data to calibrate the headphones for the user; and
a processor coupled to the speakers and to the microphone,
wherein the processor is configured to apply a transfer function to audio signals transmitted to the user via the speakers, and
wherein the transfer function is based in part on the audio data from the microphone to account for characteristics of ears of the user.

* * * * *